United States Patent
Hollis et al.

(10) Patent No.: US 7,305,367 B1
(45) Date of Patent: Dec. 4, 2007

(54) INSTANTANEOUS PRICE QUOTATION SYSTEM FOR CUSTOM MANUFACTURED PARTS

(75) Inventors: Ronald L. Hollis, Roswell, GA (US); Michael D. Maurice, Atlanta, GA (US)

(73) Assignee: Quickparts.com, Atlanta, GA (US)

( * ) Notice: Subject to any disclaimer, the term of this patent is extended or adjusted under 35 U.S.C. 154(b) by 783 days.

(21) Appl. No.: 09/736,555

(22) Filed: Dec. 13, 2000

(51) Int. Cl.
G06F 99/00 (2006.01)

(52) U.S. Cl. .......................... 705/400; 705/1; 705/26; 705/27; 707/2; 700/157

(58) Field of Classification Search .................... 705/1, 705/26, 27, 400, 29, 7; 703/6, 9, 21; 707/104.1, 707/101, 2; 700/96, 157
See application file for complete search history.

(56) References Cited

U.S. PATENT DOCUMENTS

| | | | |
|---|---|---|---|
| 5,033,014 A * | 7/1991 | Carver et al. .................. 703/1 |
| 5,293,479 A | 3/1994 | Quintero et al. ............. 395/161 |
| 5,495,430 A * | 2/1996 | Matsunari et al. ............. 703/6 |
| 5,548,698 A * | 8/1996 | Smith et al. ................. 345/660 |
| 5,552,995 A * | 9/1996 | Sebastian ..................... 700/97 |
| 5,570,292 A * | 10/1996 | Abraham et al. ........... 700/157 |
| 5,655,087 A * | 8/1997 | Hino et al. .................... 705/29 |
| 5,758,328 A * | 5/1998 | Giovannoli .................. 705/26 |
| 5,784,286 A | 7/1998 | Hirose et al. ............... 364/488 |
| 5,822,206 A * | 10/1998 | Sebastian et al. ............. 700/97 |
| 5,847,971 A | 12/1998 | Ladner et al. .............. 364/512 |
| 5,988,862 A * | 11/1999 | Kacyra et al. ................. 703/6 |
| 5,999,908 A * | 12/1999 | Abelow ......................... 705/1 |
| 6,064,982 A * | 5/2000 | Puri ............................ 705/27 |
| 6,096,088 A * | 8/2000 | Yu et al. ....................... 703/9 |
| 6,173,210 B1 | 1/2001 | Bjornson et al. ............. 700/99 |
| 6,223,092 B1 * | 4/2001 | Miyakawa et al. ......... 700/103 |
| 6,295,513 B1 | 9/2001 | Thackston ..................... 703/1 |
| 6,330,523 B1 * | 12/2001 | Kacyra et al. .............. 702/159 |
| 6,343,285 B1 * | 1/2002 | Tanaka et al. .............. 705/400 |
| 6,351,734 B1 | 2/2002 | Lautzenheiser et al. ........ 705/8 |
| 6,493,679 B1 * | 12/2002 | Rappaport et al. ............ 705/29 |
| 6,560,498 B1 * | 5/2003 | Shin et al. .................... 700/97 |
| 6,647,305 B1 * | 11/2003 | Bigelow ....................... 700/97 |
| 6,675,055 B1 | 1/2004 | Fischer ........................ 700/97 |
| 6,775,647 B1 | 8/2004 | Evans et al. ................... 703/7 |
| 6,810,401 B1 * | 10/2004 | Thompson et al. ......... 707/101 |
| 6,859,768 B1 | 2/2005 | Wakelam et al. .............. 703/1 |
| 2001/0023418 A1 * | 9/2001 | Suzuki et al. ............... 705/400 |

(Continued)

FOREIGN PATENT DOCUMENTS

EP 1112828 A1 * 7/2001

(Continued)

OTHER PUBLICATIONS

4pcb.com.*

(Continued)

Primary Examiner—Thomas A. Dixon
Assistant Examiner—Freda A. Nelson
(74) Attorney, Agent, or Firm—Waddey & Patterson, P.C.; Lucian Wayne Beavers

(57) ABSTRACT

An automated quotation system is provided for generating firm binding price quotations for custom manufactured parts in either an online or offline context.

63 Claims, 11 Drawing Sheets

U.S. PATENT DOCUMENTS

| | | | |
|---|---|---|---|
| 2001/0032166 A1* | 10/2001 | Ruffo et al. | 705/37 |
| 2002/0004761 A1* | 1/2002 | Sekitani | 705/26 |
| 2002/0026385 A1* | 2/2002 | McCloskey et al. | 705/27 |
| 2002/0026392 A1* | 2/2002 | Shimizu et al. | 705/29 |
| 2002/0035463 A1* | 3/2002 | Lynch et al. | 703/21 |
| 2002/0065790 A1* | 5/2002 | Oouchi | 705/400 |
| 2002/0124010 A1 | 9/2002 | Park et al. | 707/200 |

FOREIGN PATENT DOCUMENTS

| | | | |
|---|---|---|---|
| EP | 1168225 A1 * | 1/2002 | |
| JP | 09-62729 A * | 3/1997 | |
| JP | 09-114873 A * | 5/1997 | |
| JP | 09114873 A * | 5/1997 | |
| JP | 09160945 A * | 5/1997 | |
| JP | 09160945 A * | 6/1997 | |
| JP | 2001-290977 | 10/2001 | |
| JP | 2001-357075 | 12/2001 | |
| WO | WO9534468 * | 12/1995 | |
| WO | WO98/34178 | 8/1998 | |
| WO | WO 01/77781 A2 * | 10/2001 | |
| WO | WO01/82519 | 11/2001 | |

OTHER PUBLICATIONS

Partnow.com.*
Protomold.com.*
Biba.uni-bremen.de/groups/rp/rp_sites.html.*
Protomold.com.*
Exhibit A—Screen Copy of website of Metro Plastics.
Exhibit B—Screen Copy of website of 3DQ Concepts.
Exhibit A: pages from the website of www.materialise.be as recorded on www.archive.org as being saved on Apr. 12, 1997.
Exhibit B: pages from the website of 3DQ Concepts as recorded on www.archive.org as being saved on May 25, 2000.
Exhibit C: printout of pages of the website www.advancedcircuits.com as recorded on www.archive.org as being saved on Mar. 3, 1999.
Exhibit D: "A Marketplace of Design Agents for Distributed Concurrent Set-Based Design", by Parunak et al. as published in the Aug. 20-22, 1997, 4th ISPE International Conference on Concurrent Engineering: Research and Applications., pp. 287-293.
Exhibit E: "A World Wide Web Approach for Capturing and Deploying Preference Over the Internet", by D' Ambrosio et al. as published in the Aug. 20-22, 1997, 4th ISPE International Conference on Concurrent Engineering: Research and Applications., pp. 294-300.
Exhibit F: "Tele-Manufacturing: Object Slicing for Rapid Prototyping on the Internet", by Roy et al. as published in the Aug. 20-22, 1997, 4th ISPE International Conference on Concurrent Engineering: Research and Applications., pp. 300-307.
Exhibit A: English translation of Japanese Patent Application No. 7-221929.

* cited by examiner

FIG. 5

![Quickparts.com Formal Quotation - Microsoft Internet Explorer]

Address: http://www.quickparts.com/cgi-bin/quote.dll

Quickparts.com

5825 Glenridge Drive
Bldg 2, Suite 107
Atlanta, GA 30328
877-521-8683
831-401-2492 (Fax)

Formal Quotation

Quote Code: 15661                    November 25, 2000

Customer Information

Company Contact: Mark Mackie          Phone: 404-303-6612
Company Name: Quickparts.com          Fax: 831-401-2492
Email: mmackie@quickparts.com

| Process | Part Name | Qty | Quote | Total |
|---------|-----------|-----|-------|-------|
| SLA | Datapart D.stl | 3 | | |
| SLA | Datapart V.stl | 5 | | |
| | | | | |
| | | | | |
| | | | | |
| | | | | |
| | | | | |
| | | | | |
| | | | | |
| | | | $ 1335 | $ 1335 |

Additional Information:

Terms Net 30 days
Delivery Standard
Finish Primed
Material SL 7540

Notes:
Please orient DatapartD with internal features facing up.

FIG. 6

INSTANTANEOUS PRICE QUOTATION SYSTEM FOR CUSTOM MANUFACTURED PARTS

BACKGROUND OF THE INVENTION

1. Field of the Invention

The present invention relates generally to automated quotation systems, and more particularly, but not by way of limitation, to an automated quotation system for providing binding instantaneous online quotes to a design engineer needing custom manufactured parts on an expedited basis.

2. Description of the Prior Art

When a design engineer is designing a new mechanical or electrical apparatus, it is often desired to construct a full scale three dimensional prototype of the apparatus in order to fully evaluate and visualize the arrangement and suitability of the components which have been proposed to make up the apparatus.

Originally, the construction of such prototypes was a painstaking, time consuming and expensive process which involved the creation by hand of each component through traditional machining processes wherein each desired component would be formed by machining away undesired material from a block of metal, plastic, wood or the like. Those traditional machining operations are generally referred to as subtractive manufacturing processes, because the component is formed by subtracting material from a solid block of material through the machining process.

More recently, with the advent of computer aided design (CAD) techniques wherein each of the proposed components is fully described by a digital electronic model, there have developed a number of additive manufacturing techniques. These additive manufacturing techniques involve the use of computer controlled manufacturing processes which can manufacture a three dimensional part from a CAD file describing the part. These additive manufacturing processes can be thought of as three dimensional printers which can take a digital file for the three dimensional part and automatically construct that part without human intervention.

These technologies for creating prototype parts from CAD files are generally referred to by the term "rapid prototyping". The following summary of rapid prototyping techniques is taken from the text of "rapid prototyping primer", Chapter 2, published by the Penn State University Department of Mechanical and Nuclear Engineering.

BACKGROUND OF RAPID PROTOTYPING FROM PENN STATE WEBSITE

The term rapid prototyping (RP) refers to a class of technologies that can automatically construct physical models from Computer-Aided Design (CAD) data. These "three dimensional printers" allow designers to quickly create tangible prototypes of their designs, rather than just two-dimensional pictures. Such models have numerous uses. They make excellent visual aids for communicating ideas with co-workers or customers. In addition, prototypes can be used for design testing. For example, an aerospace engineer might mount a model airfoil in a wind tunnel to measure lift and drag forces. Designers have always utilized prototypes; RP allows them to be made faster and less expensively.

In addition to prototypes, RP techniques can also be used to make tooling (referred to as rapid tooling) and even production-quality parts (rapid manufacturing). For small production runs and complicated objects, rapid prototyping is often the best manufacturing process available. Of course, "rapid" is a relative term. Most prototypes require from three to seventy-two hours to build, depending on the size and complexity of the object. This may seem slow, but it is much faster than the weeks or months required to make a prototype by traditional means such as machining. These dramatic time savings allow manufacturers to bring products to market faster and more cheaply.

At least six different rapid prototyping techniques are commercially available, each with unique strengths. Because RP technologies are being increasingly used in non-prototyping applications, the techniques are often collectively referred to as solid free-form fabrication, computer automated manufacturing, or layered manufacturing. The latter term is particularly descriptive of the manufacturing process used by all commercial techniques. A software package "slices" the CAD model into a number of thin (0.1 mm) layers, which are then built up one atop another. Rapid prototyping is an "additive" process, combining layers of paper, wax, or plastic to create a solid object. In contrast, most machining processes (milling, drilling, grinding, etc.) are "subtractive" processes that remove material from a solid block. RP's additive nature allows it to create objects with complicated internal features that cannot be manufactured by other means.

Although several rapid prototyping techniques exist, all employ the same basic five-step process. The steps are:

1. Create a CAD model of the design
2. Convert the CAD model to STL format
3. Slice the STL file into thin cross-sectional layers
4. Construct the model one layer atop another
5. Clean and Finish the Model First, the object to be built is modeled using a Computer-Aided Design (CAD) software package. Solid modelers, such as Pro/ENGINEER, tend to represent 3-D objects more accurately than wire-frame modelers such as AutoCAD, and will therefore yield better results. The designer can use a pre-existing CAD file or may wish to create one expressly for prototyping purposes. The various CAD packages use a number of different algorithms to represent solid objects. To establish consistency, the STL file format has been adopted as the standard of the rapid prototyping industry.

The second step, therefore, is to convert the CAD file into STL format. This format represents a three-dimensional surface as an assembly of planar triangles, "like the facets of a cut jewel." The file contains the coordinates of the vertices and the direction of the outward normal of each triangle. Because STL files use planar elements, they cannot represent curved surfaces exactly. Increasing the number of triangles improves the approximation, but at the cost of bigger file size. Large, complicated files require more time to pre-process and build, so the designer must balance accuracy with manageability to produce a useful STL file.

In the third step, a pre-processing program prepares the STL file to be built. Several programs are available, and most allow the user to adjust the size, location and orientation of the model. Build orientation is important for several reasons. First, properties of rapid prototypes vary from one coordinate direction to another. For example, prototypes are usually weaker and less accurate in the z (vertical) direction than in the x-y plane. In addition, part orientation partially determines the amount of time required to build the model. Placing the shortest dimension in the z direction reduces the number of layers, thereby shortening build time.

The preprocessing software slices the STL model into a number of layers from 0.01 mm to 0.7 mm thick, depending on the build technique. The program may also generate an auxiliary structure to support the model during the build.

Supports are useful for delicate features such as overhangs, internal cavities, and thin-walled sections.

The fourth step is the actual construction of the part. Using one of several techniques RP machines build one layer at a time from polymers, paper, or powdered metal. Most machines are fairly autonomous, needing little human intervention.

The final step is post-processing. This involves removing the prototype from the machine and detaching any supports. Some photosensitive materials need to be fully cured before use. Prototypes may also require minor cleaning and surface treatment. Sanding, sealing, and/or painting the model will improve its appearance and durability.

Most commercially available rapid prototyping machines use one of six techniques.

1. Stereolithography

Patented in 1986, stereolithography started the rapid prototyping revolution. The technique builds three-dimensional models from liquid photosensitive polymers that solidify when exposed to ultraviolet light. The model is built upon a platform situated just below the surface in a vat of liquid epoxy or acrylate resin. A low-power highly focused UV laser traces out the first layer, solidifying the model's cross section while leaving excess areas liquid.

Next, an elevator incrementally lowers the platform into the liquid polymer. A sweeper re-coats the solidified layer with liquid, and the laser traces the second layer atop the first. This process is repeated until the prototype is complete. Afterwards, the solid part is removed from the vat and rinsed clean of excess liquid. Supports are broken off and the model is then placed in an ultraviolet oven for complete curing.

2. Laminated Object Manufacturing

In this technique, developed by Helisys of Torrance, Calif., layers of adhesive-coated sheet material are bonded together to form a prototype. The original material consists of paper laminated with heat-activated glue and rolled up on spools. A feeder/collector mechanism advances the sheet over the build platform, where a base has been constructed from paper and double-sided foam tape. Next, a heated roller applies pressure to bond the paper to the base. A focused laser cuts the outline of the first layer into the paper and then cross-hatches the excess area (the negative space in the prototype). Cross-hatching breaks up the extra material, making it easier to remove during post-processing. During the build, the excess material provides excellent support for overhangs and thin-walled sections. After the first layer is cut, the platform lowers out of the way and fresh material is advanced. The platform rises to slightly below the previous height, the roller bonds the second layer to the first, and the laser cuts the second layer. This process is repeated as needed to build the part, which will have a wood-like texture. Because the models are made of paper, they must be sealed and finished with paint or varnish to prevent moisture damage. In recent years Helisys has developed several new sheet materials, including plastic, water-repellent paper, and ceramic and metal powder tapes. The powder tapes produce a "green" part that must be sintered for maximum strength.

3. Selective Laser Sintering

Developed by Carl Deckard for his master's thesis at the University of Texas, selective laser sintering was patented in 1989. The technique, uses a laser beam to selectively fuse powdered materials, such as nylon, elastomer, and metal, into a solid object. Parts are built upon a platform which sits just below the surface in a bin of the heat-fusable powder. A laser traces the pattern of the first layer, sintering it together. The platform is lowered by the height of the next layer and powder is reapplied. This process continues until the part is complete. Excess powder in each layer helps to support the part during the build. SLS machines are produced by DTM of Austin, Tex.

4. Fused Deposition Modeling

In this technique, filaments of heated thermoplastic are extruded from a tip that moves in the x-y plane. Like a baker decorating a cake, the controlled extrusion head deposits very thin beads of material onto the build platform to form the first layer. The platform is maintained at a lower temperature, so that the thermoplastic quickly hardens. After the platform lowers, the extrusion head deposits a second layer upon the first. Supports are built along the way, fastened to the part either with a second, weaker material or with a perforated junction. Stratasys, of Eden Prairie, Minn. makes a variety of FDM machines ranging from fast concept modelers to slower, high-precision machines. Materials include polyester, polypropylene, ABS, elastomers, and investment casting wax.

5. Solid Ground Curing

Developed by Cubital, solid ground curing (SGC) is somewhat similar to stereolithography (SLA) in that both use ultraviolet light to selectively harden photosensitive polymers. Unlike SLA, SGC cures an entire layer at a time. First, photosensitive resin is sprayed on the build platform. Next, the machine develops a photomask (like a stencil) of the layer to be built. This photomask is printed on a glass plate above the build platform using an electrostatic process similar to that found in photocopiers. The mask is then exposed to UV light, which only passes through the transparent portions of the mask to selectively harden the shape of the current layer.

After the layer is cured, the machine vacuums up the excess liquid resin and sprays wax in its place to support the model during the build. The top surface is milled flat, and then the process repeats to build the next layer. When the part is complete, it must be de-waxed by immersing it in a solvent bath. SGC machines are distributed in the U.S. by Cubital America Inc. of Troy, Mich. The machines are quite big and can produce large models.

6. -Jet Printing

Unlike the above techniques, Ink-Jet Printing refers to an entire class of machines that employ ink-jet technology. The first was 3D Printing (3DP), developed at MIT and licensed to Soligen Corporation, Extrude Hone, and others. Parts are built upon a platform situated in a bin full of powder material. An ink-jet printing head selectively "prints" binder to fuse the powder together in the desired areas. Unbound powder remains to support the part. The platform is lowered, more powder added and leveled, and the process repeated. When finished, the green part is sintered and then removed from the unbound powder. Soligen uses 3DP to produce ceramic molds and cores for investment casting, while Extrude Hone hopes to make powder metal tools and products. Sanders Prototype of Wilton, N.H. uses a different ink-jet technique in its Model Maker line of concept modelers. The machines use two ink-jets. One dispenses low-melt thermoplastic to make the model, while the other prints wax to form supports. After each layer, a cutting tool mills the top surface to uniform height. This yields extremely good accuracy, allowing the machines to be used in the jewelry industry. 3D Systems has also developed an ink-jet based system. The Multi-Jet Modeling technique uses an array of 96 separate print heads to rapidly produce thermoplastic models. If the part is narrow enough, the print head can deposit an entire layer in one pass. Otherwise, the head makes several passes.

PRIOR ART BID QUOTATION PROCESSES

Until the development of the present invention, a design engineer wishing to obtain components by one of the above described rapid prototyping processes has still been required to go through traditional procurement techniques, including the sending of requests for quotation to multiple vendors providing rapid prototyping parts, then waiting for the manual generation of quotations and transmission of the same back to the engineer, then selection of the preferred quotation and subsequent submission of a purchase order to the chosen vendor. Thus, the bid solicitation process utilizing existing techniques still takes many days.

Furthermore, the various vendors of rapid prototyping parts have continued to provide their quotations primarily based upon manually generated quotes which can consume many man hours for the preparation of a quotation.

Prior art techniques for obtaining quotations for a single prototype part may take one to two days. Those for obtaining a quotation for increased quantities on the order of one hundred of any part may take approximately one week, and obtaining quotations for larger quantities may take as long as two weeks.

When one realizes that perhaps 95% or more of the quotations for rapid prototyping parts which are generated by potential vendors, do not result in actual purchase orders, it becomes apparent that there is a tremendous waste of manpower and delay in the procurement system as it currently exists.

Accordingly, there is a need for an automated procurement system which can provide rapid, accurate and binding price quotations without the need for human intervention.

SUMMARY OF THE INVENTION

The present invention provides systems providing instantaneous automatic binding price quotations for custom manufactured parts described by CAD files, which systems may be utilized in either an online or offline environment over the Internet, or an offline environment such as on a desktop computer.

In one embodiment, a method for providing a firm price quotation for custom manufactured parts includes the steps of:
  a. permitting a client to access a server computer system from a client computer over a global communication network;
  b. uploading from the client computer to the server computer system, a CAD file describing the custom manufactured parts;
  c. analyzing the CAD file on the server computer system to determine one or more manufacturing criteria for the custom manufactured parts;
  d. calculating in the server computer system a firm price quotation for the custom manufactured part based upon the one or more manufacturing criteria; and
  e. transmitting the price quotation to the client computer over the global communication network.

In another embodiment of the invention which is suitable for use in both offline and online environments, the method of the invention may be described as providing a firm price quotation for a custom manufactured part through the series of steps comprising:

a. loading onto a computer system, a CAD file describing the custom manufactured parts;
  b. analyzing the CAD file on the computer system without human intervention to determine one or more manufacturing criteria for the custom manufactured parts;
  c. calculating in the computer system without human intervention a firm price quotation for the custom manufactured parts based upon the one or more manufacturing criteria; and
  d. displaying the price quotation.

In another embodiment, the invention encompasses a software program stored in a computer readable media, for generating binding price quotations for custom manufactured parts, comprising:
  a. a CAD file analysis program portion for receiving a CAD file and analyzing the CAD file to determine one or more manufacturing criteria describing each custom manufactured part; and
  b. a price generation program portion for generating a binding price quotation based upon the one or more manufacturing criteria.

In another aspect of the invention, the software program just described may also include:
  c. a feature selection program portion for allowing a user of the program to select one or more features for the parts being quoted; and/or
  d. an order generation program portion for assembling all electronic files corresponding to a price quotation into a single directory for transmission to a supplier responsible for the quotation; and/or
  e. a buildset grouping program portion for grouping a plurality of parts making up the buildset into a plurality of subsets of parts.

It is therefore, a general object of the present invention to provide an automated price quotation system for custom manufactured parts identified by CAD files.

Another object of the present invention is the provision of an instantaneous price quotation system for custom manufactured parts identified by CAD files.

Still another object of the present invention is the provision of an automated price quotation system which can be accessed in an online environment.

And another object of the present invention is the provision of an automated price quotation system for custom manufactured parts which can be utilized in an offline context.

Another object of the present invention is to provide automated quotation of firm prices for custom manufactured parts without the need for human intervention in the quotation process.

Still another object of the present invention is the provision of pricing formulas for custom manufactured parts corresponding to a specific business operation facility which provide accurate price quotations automatically without the need for human intervention.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 5 is a screen shot of the page from applicant's website by which a customer may select other options including the quantity of each part to be quoted, the finish to be provided on the parts, and the material to be used to manufacture the parts.

FIG. 6 is a screen shot of applicant's website displaying an automatically generated formal quotation.

DETAILED DESCRIPTION OF THE PREFERRED EMBODIMENTS

Figure 1:
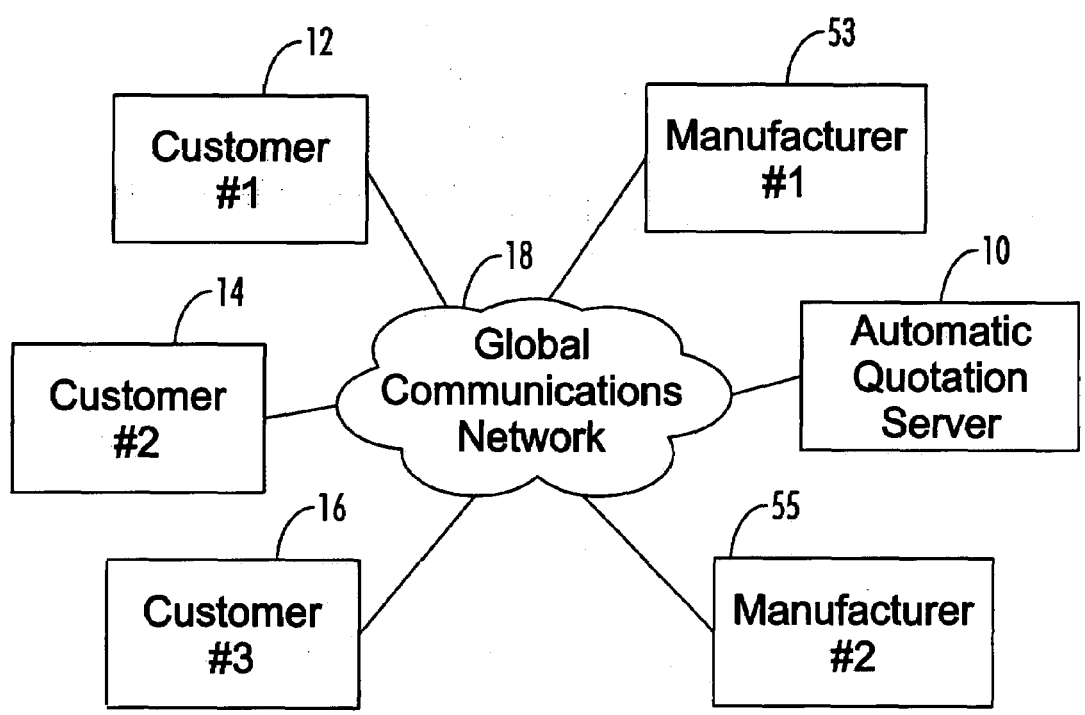
FIG. 1 is a schematic illustration of a network comprised of the automatic quotation server of the present invention connected to a global communications network which provides access to the automated quotation system by various customers.

Referring now to the drawings, and particularly to FIG. 1, a server computer system 10 is provided, which will contain software programming as described in detail below with regard to FIGS. 7-11, for providing firm price quotations for custom manufactured parts.

The server computer system 10 can be accessed by a plurality of client or customer computers, such as 12, 14 and 16 over a global communication system 18, such as the Internet.

As of the filing of this application, applicant's automatic quotation server is currently accessible on the world wide web at quickparts.com, the details of which are incorporated herein by reference.

Figure 2:
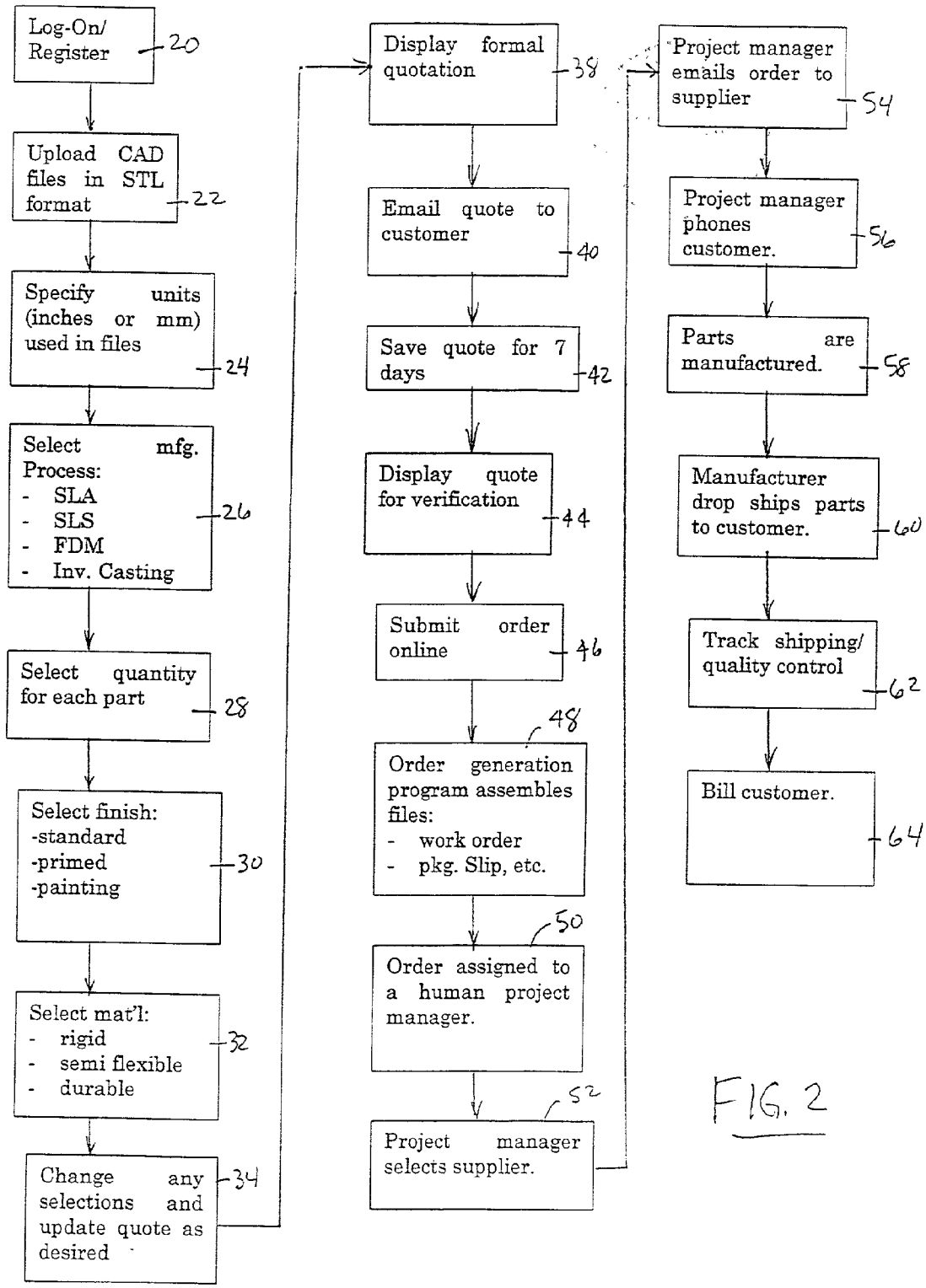
FIG. 2 is a schematic flowchart summarizing the primary steps involved in accessing the automated quotation server online and obtaining instant binding quotations for custom manufactured parts via the use of the automated quotation system.

FIG. 2 is a flowchart summarizing the methods of providing a firm price quotation from the automatic quotation server system 10 in an online context, and FIGS. 3-6 are screen shots of selected web pages from applicant's website illustrating the major interaction between a customer using the website and the automatic quotation system provided on the website.

It is noted that the embodiment described illustrates a system which uses some but not all of the existing rapid prototyping processes discussed above. The invention can, of course, be used with those other rapid prototyping processes, and also with various formative manufacturing processes. In its broadest aspects, it could also be applied to subtractive machining processes.

Referring now to FIG. 2, as indicated at block 20, a user of the online automatic quotation system 10 will first log onto the website and register as a user. If the customer has previously utilized the website, the site will automatically recognize the customer via a cookie previously placed upon the client computer 12, thus expediting the log on/registration process.

Next, as indicated in block 22, the customer will upload the CAD files in STL format over the global communications network 18 onto the server computer system 10.

Figure 3:
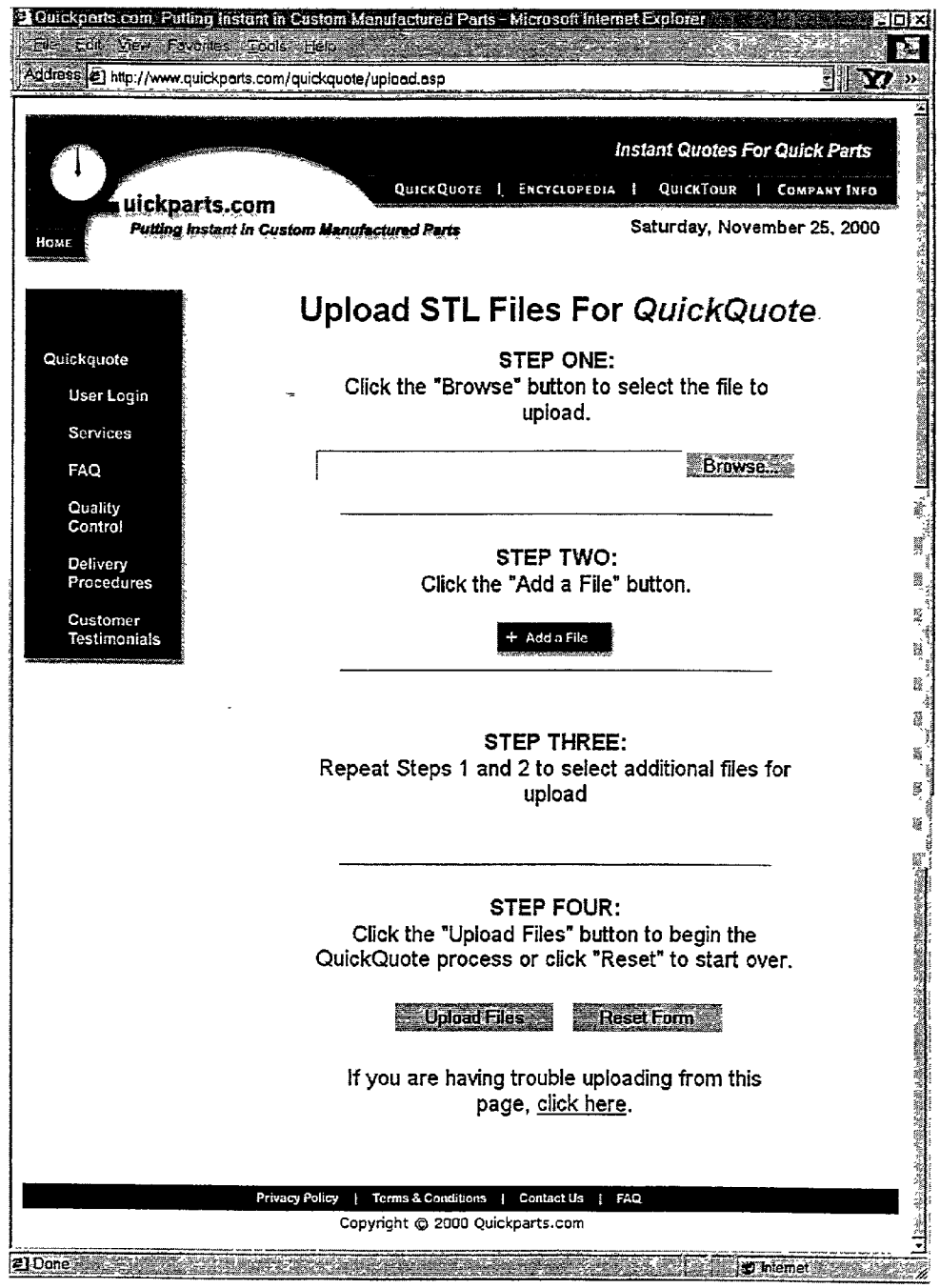
FIG. 3 is a screen shot of applicant's online website page with which a customer uploads their CAD files for quotation.

FIG. 3 illustrates the screen displayed on the client computer 12 during the file uploading process.

Figure 4:
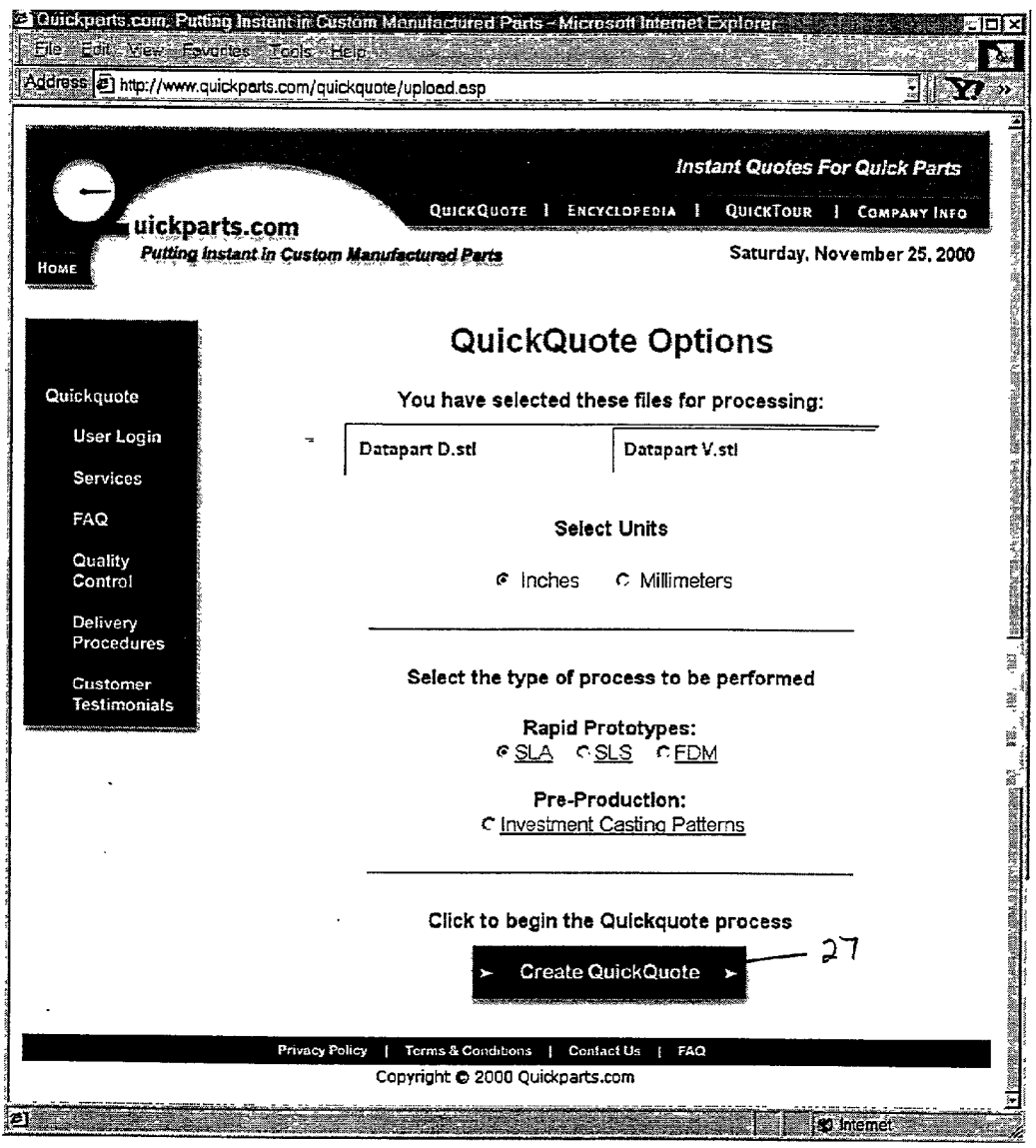
FIG. 4 is a screen shot of applicant's website page on which the customer may select various options such as dimensional units and manufacturing process.

Next, as shown in block 24, and as illustrated in the screen shot of FIG. 4, the customer will be asked to specify the units, i.e., inches or millimeters, utilized in the files which have just been uploaded.

As described in block 26 and also illustrated in FIG. 4, the customer will then select the preferred manufacturing process. In the embodiment illustrated in FIG. 4, the customer may select from any one of three additive manufacturing processes, namely stereolithography (SLA), selective laser sintering (SLS) or fused deposition modeling (FDM), or the customer may select one formative manufacturing process, namely investment casting patterns. Other manufacturing processes could be added to this list by the operator of the system 10.

Figure 5:
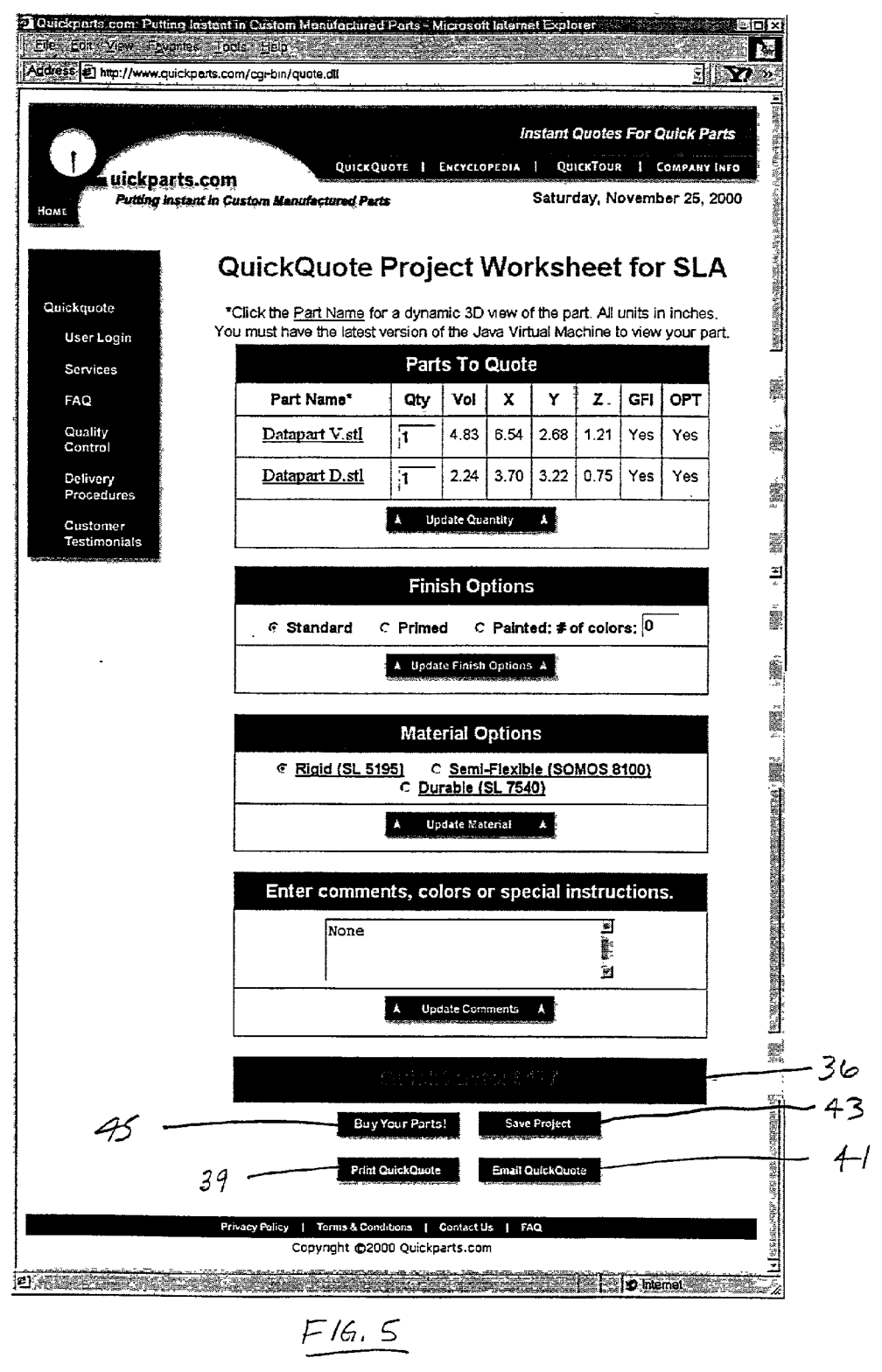

The customer then clicks on button 27 to create a quotation, which leads to the screen shown in FIG. 5.

Then as illustrated in block 28 and in FIG. 5, the customer may select a desired quantity for each of the part files which have been uploaded, and as illustrated in blocks 30 and 32 the customer may also select a finish option and a material option.

In the example illustrated in FIG. 5, the finish options include standard, primed, and painted finishes. The material options include rigid, semi-flexible and durable materials. It is noted that these options are process dependent, and the options shown in FIG. 5 are for the SLA process only.

As indicated by block 34, and as illustrated in FIG. 5, the customer may update and change each of the selected options such as quantity of each part, finish options and material options, and upon each change, the quoted price as indicated at 36 in FIG. 5 will be automatically updated substantially instantaneously upon the next screen refresh.

As shown on the bottom of FIG. 5, once a quotation has been provided the customer has numerous options.

Clicking on button 39, the customer can choose to display the formal quotation, as indicated by block 38 and as illustrated in FIG. 6.

Clicking on button 41, the customer may also choose to have the formal quotation e-mailed to the customer, as indicated at block 40.

Clicking on button 43, the customer may select to have the quotation saved, as indicated in block 42. In one embodiment, the system 10 will save the quotation for a selected period of time, such as 7 days, before it is purged from the system.

By clicking on button 45, the customer may also choose to buy the parts online, which selection will lead the customer through a quotation verification step as indicated by block 44 and ultimately the customer will submit the order online as indicated by block 46.

After the customer has submitted the order online as indicated in block 46, the customer's online interaction with the automated quotation system 10 is completed.

Then, subsequent actions taken by the operator of the automated quotation system 10 are described with reference to blocks 48-64.

As indicated in block 48, the automated quotation system 10 will then utilize an order generation program portion to assemble various files such as work orders, packing slips and the like electronically.

As indicated in block 50, the order is then assigned to a human project manager employed by the operator of the automated quotation system 10. The project manager then manually selects a manufacturer such as 53 or 55 indicated in FIG. 1, and the electronic order with associated CAD files is then e-mailed to the supplier or manufacturer as indicated in block 54. This occurs over the global communications network which is accessed by the automated quotation server 10 and the various manufacturers 53 and 55.

As indicated in block 56, the human project manager then contacts the customer by telephone to discuss the status of the order and any questions that the customer may have. It is noted that similar human intervention may occur earlier in the ordering process if a problem is encountered with the requested quotation. For example, if the customer attempts to obtain a quotation for a part that is too big to fit in the available manufacturing machinery, this may prompt a phone call to the customer from a human project manager to discuss available options. Also, the automatic quotation software may be programmed to recognize when a customer is having difficulty with the automatic quotation system, thus, again prompting an immediate telephone call by a human project manager to assist the customer with the process.

As indicated by block 58, the parts will then be manufactured by one of the suppliers such as 53 or 55 utilizing the CAD files which have previously been submitted by the customer when obtaining the quotation. The manufacturers 53 and 55 are required by the operator of the automatic quotation server 10 to have previously contractually committed to honor the price quotations which are generated by the automated quotation system 10.

As indicated by block 60, after the part is manufactured, the manufacturer will drop ship the part directly to the customer with labeling indicating the operator of the automated quotation server system 10 as the source of the product. All of the labeling has been automatically generated as indicated at step 48.

The operator of the automated quotation system 10 will track the shipping of the parts and perform other quality control measures as indicated by block 62, and ultimately, the customer will be billed for the parts as indicated by block 64.

Figure 7:
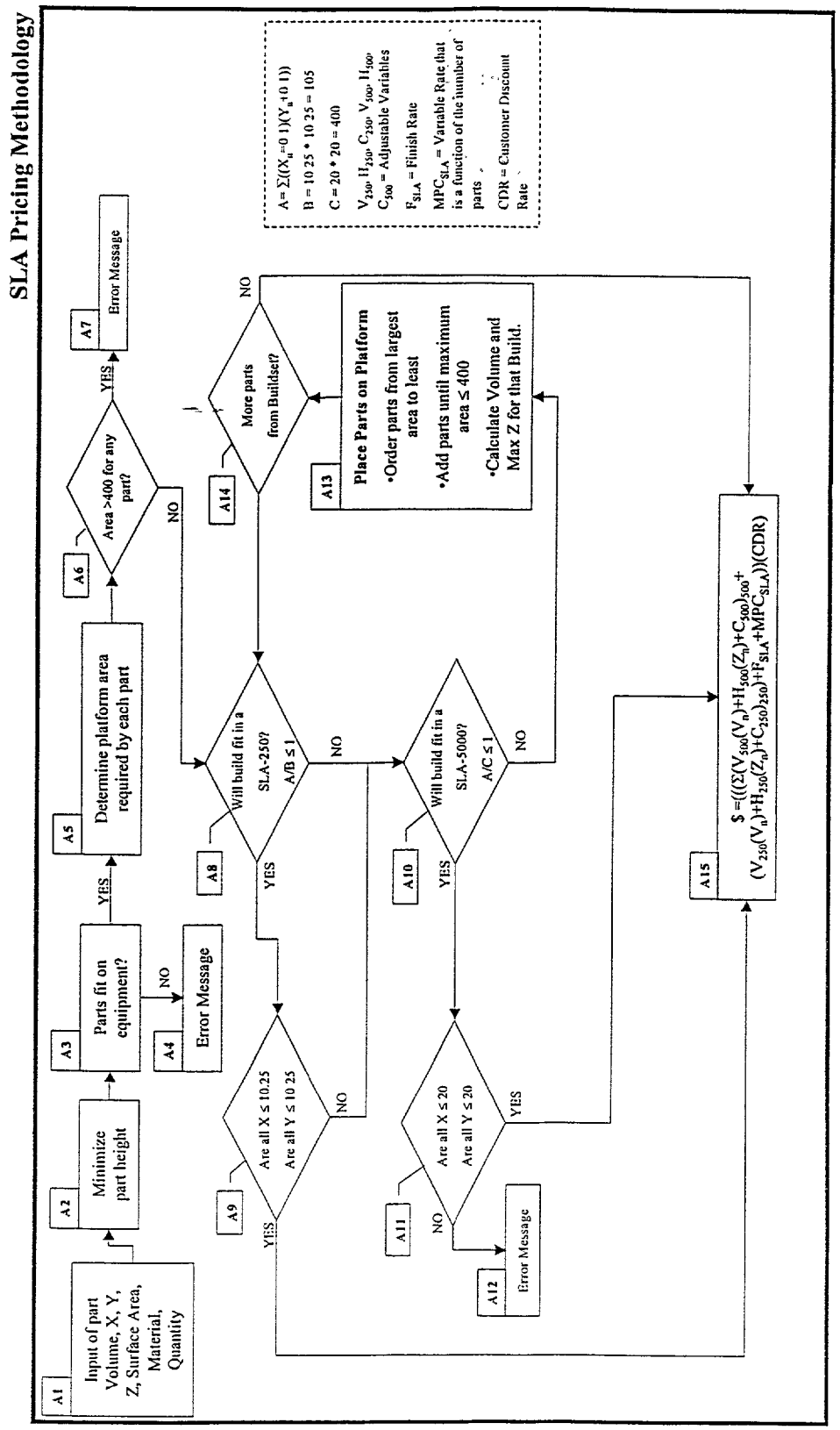
FIG. 7 is a flowchart describing applicant's software program utilized to analyze a CAD file and provide an automatic price quotation utilizing the stereolithography process.

Description of the Computer Program for Automated Quotation of Prices for Stereolithography Manufacturing Processes Referring now to FIG. 7, a flowchart is there provided which describes the structure of the software program utilized in the automated quotation server system 10 to create price quotations for custom manufactured parts which are to be manufactured by the stereolithography process.

As indicated in block A1, the software first analyzes each STL file and calculates the volume of the part, the X, Y and Z extents of the part, and the surface area of the part. This can generally be described as analyzing the CAD file on the server computer system 10 to determine one or more manufacturing criteria for the custom manufactured part.

As further noted in block A1, the material to be utilized and the quantity of each part will have been input by the customer as previously described with regard to FIG. 5.

The software utilized to calculate these manufacturing criteria is similar to various commercially available STL viewer software programs such as Solidview available from Solid Concepts, or 3-D View available from Actify, with suitable modifications to the software to allow it to automatically input those manufacturing criteria into the remainder of the software program illustrated in FIG. 7.

Next, as indicated in block A2 of FIG. 7, the part will be oriented so as to minimize the part height. It will be appreciated by those skilled in the stereolithography art, that the minimization of the part height in a stereolithography manufacturing process minimizes the time required for the manufacturing operation and thus, minimizes the cost of manufacturing the part.

As indicated in block A3, the software will next check to determine whether each of the parts is small enough to fit within the manufacturing space which is provided by the stereolithography machine upon which the part is to be built.

If the part is not small enough to fit on the equipment, an error message will be generated as indicated by block A4, which may prompt a telephone call from a human project manager to the customer as previously discussed.

Assuming each of the parts is small enough to be manufactured by the available equipment, then as indicated in block A5, the software program will determine the platform area which will be required by each part.

As will be understood by those familiar with the stereolithography manufacturing process, each of the parts is built up upon a platform within the stereolithography machine. Thus, in block A5, the footprint of each part to be built is determined, and this footprint will include the actual footprint of the part along with a small spacing, e.g. 1/10 of an inch, around the part to provide spacing between adjacent parts on the platform.

The particular process illustrated in FIG. 7 anticipates the use of one of two different available manufacturing machines. The first machine is referred to in block A8 as the SLA-250 machine, which has a platform area of 10.25 inches by 10.25 inches. The second machine is referred to in block A10 as the SLA-5000 machine which has a platform area of 20 inches by 20 inches. Thus, the maximum platform area which is available is that of the SLA-5000 machine which has a platform area of 400 square inches.

Thus, in block A6, the software inquires as to whether the required platform area for any of the parts is greater than 400 square inches. If the answer to this query is yes, then as indicated at block A7, an error message is generated indicating that the part is too large to be manufactured by the available equipment, and again, human intervention will be required with the human project manager placing a phone call to the customer to discuss available options.

Assuming the query in block A6 is answered in the negative, then the software moves to block A8 where it will first inquire as to whether the total required platform area for all of the parts which have been ordered, which collection of parts may be referred to as a build or buildset, will fit on the smaller SLA-250 machine. This query is placed in the form of $A/B \leq 1?$, where A is the sum of the required areas for all of the parts, and wherein B is a constant which in this case is 105 square inches which is the available surface area on the platform of the SLA-250 machine. If this ratio is less than 1, then the software moves to block A9, and then the inquiry is made to determine that the maximum X or Y extent of each part is less than 10.25 inches, i.e., to determine that each part will fit on the platform of the SLA-250 machine. If the answer to the query of block A9 is affirmative, then the software moves to block A15, wherein the pricing formula will be applied.

If either of the queries, A8 or A9 are negative, then the software moves to block A10 which will similarly inquire to determine whether the entire buildset will fit on the platform of an SLA-5000 machine. If the answer to this query is yes, then the software moves to block A11 to inquire as to whether each of the components has its X and Y dimensions small enough to fit on the available 20 inch by 20 inch platform. If the answer to either of these inquiries is negative, then the software generates an error message as indicated at A12, which message will indicate that at least one of the parts being requested will not fit on either of the available machines. This will prompt a telephone call by a human project manager to the customer to discuss available options.

Assuming that the answer to query A11 is positive, then the program will move to block A15 where the pricing formula will be applied.

If the answer to the query at block A10 is negative, indicating the entire buildset will not fit on the platform of the SLA-5000 machine, then the software moves to block A13, which can be described as buildset grouping program portion for grouping a plurality of parts making up the buildset into a plurality of subsets of parts, each subset being of a size that will fit upon an available platform area of a selected manufacturing machine. This software program portion will first create a list placing the parts in order from largest to least required platform area. Then it will select the largest parts into a first subset until the maximum number of parts are chosen which still have a combined required platform area less than 400 square inches, which is the available platform size of the SLA-5000 machine. The program will then calculate the volume and maximum height for that first subset.

The program then moves to block A14 to inquire as to whether there are additional parts requested which were not included in the first subset.

The answer to that query of block A14 being positive will lead back through queries A8 and A10 back to block A13 which will cause the software to create a second subset of the requested buildset.

The process will be repeated until the entire requested buildset has been grouped into a plurality of subsets of parts, each subset being of a size that will fit upon the platform of either the SLA-5000 or SLA-250 machine.

Once all of the requested parts have been grouped into the various buildsets, the software will move from query block A14 to block A15 wherein the pricing formula will be applied.

The pricing formula set forth in block A15 is generally in the following form:

$$\text{price} = a*V + b*H + c; \quad \text{(Equation 1)}$$

where:
a, b and c are preprogrammed constants;
V corresponds to the volume of the parts to be built; and
H corresponds to the vertical height of the parts in the selected orientations.

The specific pricing formula set forth in block A15 is as follows:

$$\$ = (((\Sigma(V_{500}(V_n) + H_{500}(Z_n) + C_{500})_{500} + (V_{250}(V_n) + H_{250}(Z_n) + C_{250})_{250} + F_{SLA} + MPC_{SLA}))(CDR) \quad \text{(Equation 2)}$$

The generalized constant "a" of Equation 1 is represented in Equation 2 by the adjustable variables $V_{500}$ and $V_{250}$, for the SLA-5000 and SLA-250 machines, respectively.

The generalized variable "b" of Equation 1 is represented in Equation 2 by the adjustable variables $H_{500}$ and $H_{250}$ for the SLA-5000 and SLA-250 machines, respectively.

The generalized variable "c" of Equation 1 is represented in Equation 2 by the adjustable variables $C_{500}$ and $C_{250}$ for the SLA-5000 and SLA-250 machines, respectively.

Other pricing factors found in Equation 2 include $F_{SLA}$ which is a finish rate related to the selected finish, $MPC_{SLA}$ which is a multiple part charge relating to the number of parts ordered, and CDR which is the customer discount rate.

It will be appreciated that the adjustable variables set forth in Equation 2 will be chosen by the operator of the automated quotation system 10 to correspond to the cost structure of a given specific business operations facility and the profit level which the operator has chosen based upon competitive conditions. The preferred manner for determining the appropriate values of these adjustable variables for any specific business operations facility is to perform a statistical regression of multiple data points of pricing data for the specific business operations facility onto the pricing formula a*V+b*H+c. Thus, the specific values of the constants utilized for any one specific business operations facility at any one point in time are not necessarily relevant or applicable to another facility and/or another time in the competitive market.

The value of the pricing formula of the structure set forth in Equation 1 is that we have discovered that reasonable prices can be accurately determined in a reliably profitable manner by using a formula of the structure set forth, wherein the variables correspond to the volume of the parts being constructed and the vertical height dimension of the parts as a set when oriented in the most efficient fashion.

It will also be understood that the parts will not necessarily be actually built in the subset groupings determined by the software described with regard to FIG. 7. As will be understood by those skilled in the art, the actual manufacturer will typically group products for multiple customers into combined builds to increase the efficiency of the manufacturing operation.

The minimization of part heights in order to calculate prices with the software structure set forth in FIG. 7 is done only to minimize the quoted price, and we have discovered that even by so minimizing the quoted price, on a long term basis, the parts can be profitably built according to pricing determined with the formula of the structure set forth.

It is also noted that the software structure in FIG. 7 will minimize part height even by orienting parts in an orientation which would not be structurally sound for actual building of the parts. For example, an elongated cylindrical object would have its price quoted by laying the object on its side, whereas with many rapid prototyping manufacturing processes, the part would always be built with its longitudinal axis oriented vertically, to maximize the strength of the resulting part.

It is noted that the finish rate is added to the price otherwise calculated, and that the finish rate is an additional charge for manufacturing and is not always a function of the part price.

Similarly, the multiple part charge is an additional charge which is calculated, for example, such as $10 per part, e.g. 100 parts in the order would add $1,000 to the price.

Figure 8:
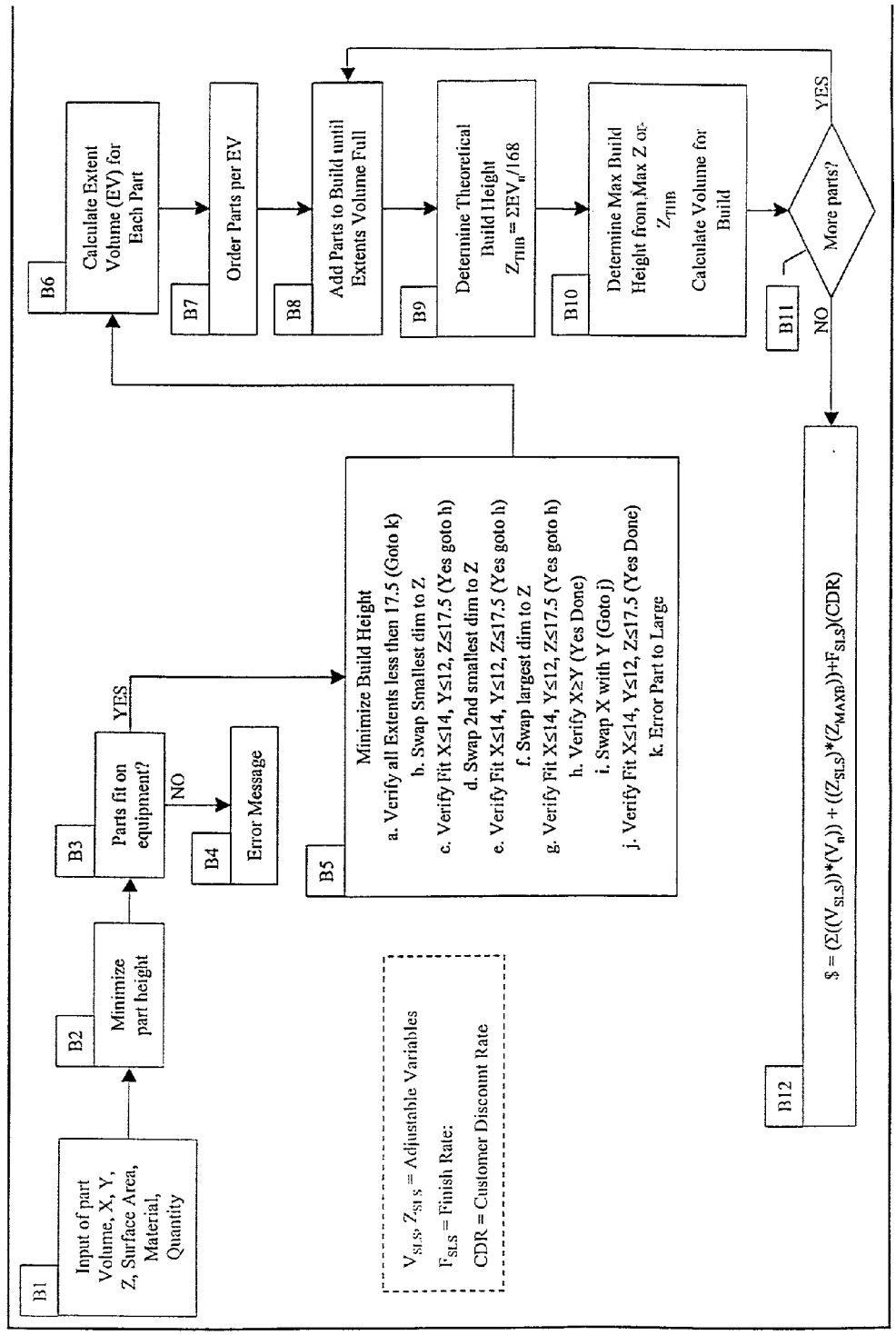
FIG. 8 is a flowchart describing applicant's computer program utilized to analyze a CAD file and provide an automatic price quotation utilizing the selective laser sintering process.

Description of Computer Program for Automated Quotation of Prices for Selective Laser Sintering Manufacturing Process Referring now to FIG. 8, a flow chart is there provided which describes the structure of the computer program utilized in the automated quotation server system 10 to create price quotations for custom manufactured parts which are to be manufactured by the selective laser sintering process.

As indicated in block B1, the program first analyzes each STL file and calculates the volume of the part, the x, y and z extents of the part, and the surface area of the part, in a manner similar to that previously described with regard to block A1 of FIG. 7.

As further noted in block B1, the material to be utilized and the quantity of each part will have been input by the customer, again as previously described with regard to FIG. 5.

Next, as indicated in block B2 of FIG. 8, the part will be oriented so as to minimize the part height.

As previously noted, this is the theoretical orientation which is performed simply to minimize the price quoted, and this is not necessarily the orientation in which the parts will actually be built.

Next, as indicated in block B3, the program will verify that the parts will fit within the working envelope available in the SLS equipment being utilized. In one particular machine corresponding to the particular dimensions utilized in FIG. 8, a model DTM2500 SLS machine manufactured by DTM, Inc., has a working envelope 12 inches by 14 inches by 17.5 inches.

As noted in block B4, if the part is not small enough to fit on the equipment, an error message will be generated which may prompt a telephone call from a human project manager to the customer as previously discussed.

Assuming each of the parts is small enough to be manufactured by the available equipment, then as indicated in block B5, a sorting routine which is outlined in block B5 will determine a theoretical minimum build height for each of the parts. This can be described as optimizing the extent dimensions by orienting the part to have the minimum possible extent in the Z direction.

Then, the program moves to block B6 wherein a theoretical extent volume (EV) is calculated for each part. This extent volume will use the x, y and z extents previously determined for the part and will add a spacing factor, such as for example, 1/10 inch, to all extents in order to provide for spacing between the parts in the manufacturing equipment as a plurality of parts are being built.

Then, block B7 will create a list of all of the parts in the particular buildset, with the list being arranged from the largest extent volume to the smallest extent volume.

Then, blocks B8, B9, B10 and B11 provide a parts grouping algorithm similar to that described above with regard to blocks A13 and A14 of FIG. 7. In the grouping algorithm of FIG. 8, however, the grouping is based upon theoretical groups which would each comprise a volume, rather than an area.

As noted in block B8, the program will add parts, beginning with the largest part, to create a subset which would fill the entire volume of the 12×14×17.5 inch working space.

Block B9 will then determine a theoretical height of the particular subset by dividing the total extent volume by 168 which is the area of the platform of the SLS machine in question (12"×14").

Block B10 will then determine the maximum build height which will either be theoretical build height determined in block B12, or the maximum Z dimension of the tallest part in the subset. Block B10 will use the largest of max Z or $Z_{THB}$.

Block B11 will then inquire as to whether all of the parts of the buildset have been included in the subset or subsets previously analyzed. If there are more parts, the program will return to block B8 to create the next subset. If all parts have been arranged into subsets, the program will move to block B12 wherein the pricing formula will be applied.

The pricing formula of block B12 is as follows:

$$\$ = ((V_{SLS}) * (V_n) + (Z_{SLS}) * (Z_{MAXB}) + F_{SLS})(CDR) \quad \text{(Equation 3)}$$

It is noted that Equation 3 is in the same general form as Equation 1, with the variables a, b and c being as follows:
A=$V_{SLS}$;
b=$Z_{SLS}$; and
c=0.

The various adjustable variables set forth above, namely $V_{SLS}$ and $Z_{SLS}$, are determined in a manner like that described above with regard to FIG. 7, by statistically regressing a plurality of historical pricing data against the format of Equation 1.

Equation 3 also includes a finish rate factor $F_{SLS}$ which is applied in a similar manner as described above regarding FIG. 7.

Equation 3 also includes a customer discount rate CDR.

It is also noted that there is no multiple part charge in Equation 3 since this particular manufacturing system has a cost structure based upon the volume of the machine capacity used, and thus, the cost associated with multiple parts is included in the volume factor.

Figure 9:
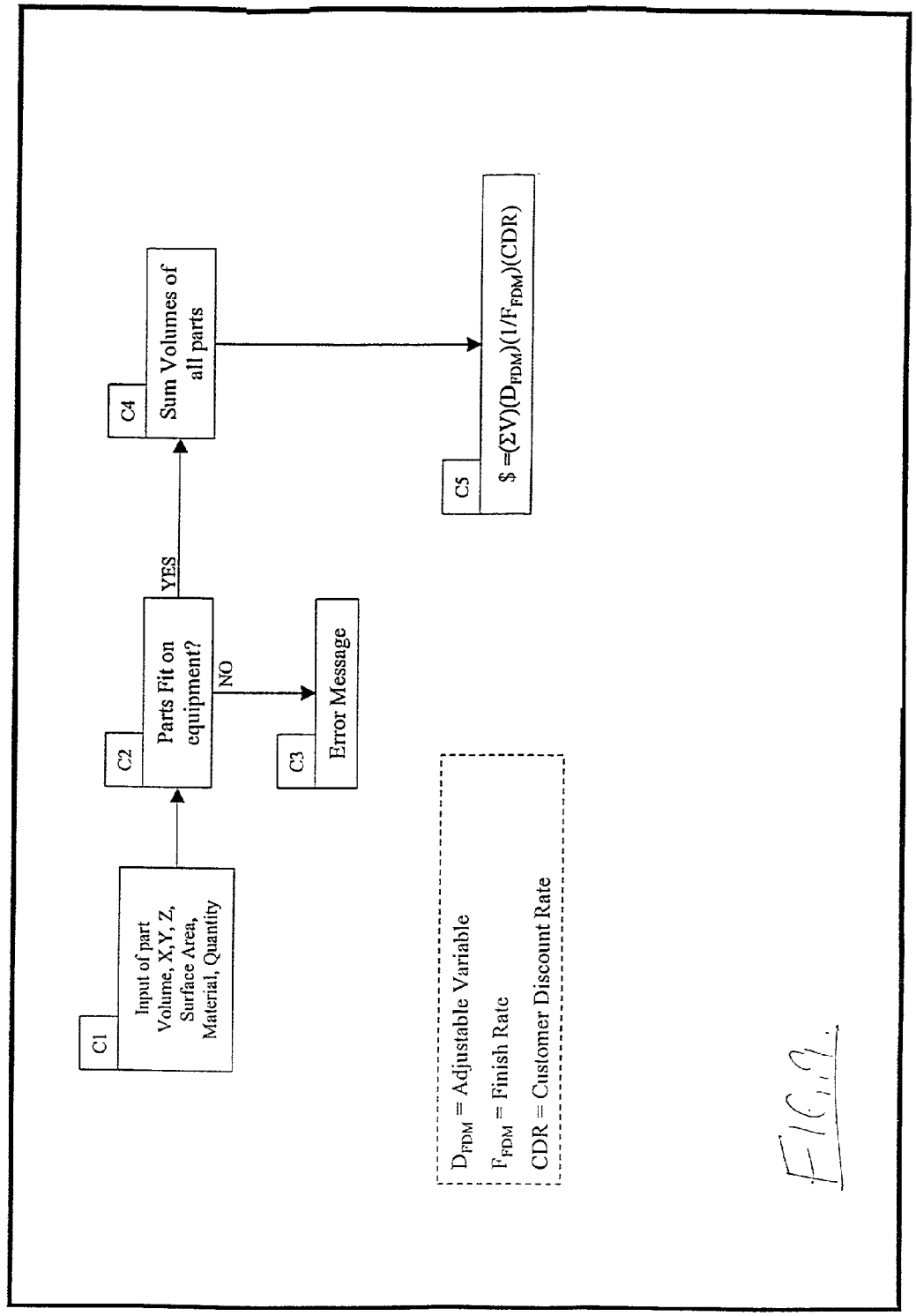
FIG. 9 is a flowchart describing applicant's computer program utilized to analyze a CAD file and provide an automatic price quotation utilizing the fused deposition modeling process.

Description of the Computer Software Program for Automated Quotation of Prices for a Fused Deposition Modeling Manufacturing Process Referring now to FIG. 9, a flow chart is there provided which describes the structure of the computer program utilized in the automated quotation server system 10 to create price quotations for custom manufactured parts which are to be manufactured by the fused deposition modeling process.

As indicated in block C1, the program first analyzes each STL file and calculates the volume of the part, the x, y and z extents of the part, and the surface area of the part.

As further noted in block C1, the material to be utilized and the quantity of each part will have been input by the customer as previously described with regard to FIG. 5.

Then as indicated in Block C2, the program will check to determine whether each of the parts is small enough to fit within the manufacturing space which is to be provided by the particular machine upon which the part is built.

If the part is not small enough to fit on the equipment, an error message will be generated as indicated by block C3, which may prompt a telephone call from the human project manager to the customer.

Assuming each of the parts is small enough to be manufactured by the available equipment, then as indicated in block C4, the program will determine the sum of the volumes of all of the parts.

Then, as shown in block C5, the following pricing formula will be applied:

$$\$ = (\Sigma V)(D_{FDM}(1/F_{FDM})(CDR) \quad \text{(Equation 4)}$$

It is noted that Equation 4 is not in the form of Equation 1. The FDM process has a cost structure such that the formula for calculating price is volume based only, and is not dependent upon the height of the components.

Description of the Computer Program for Automated Quotation of Parts Utilizing a Formative Manufacturing Process First, it is noted that the "investment casting pattern" process which is one of the options shown in the screen shot of FIG. 4, is a formative manufacturing process, rather than an additive manufacturing process. Applicant has not provided a separate software flow chart for the calculation of prices for the investment casting process. That pricing algorithm, however, is substantially identical to that described with regard to FIG. 8 for the SLS pricing process. The primary difference is that the investment casting pattern process would involve different material selections than would the SLS pricing scheme.

Figure 10:
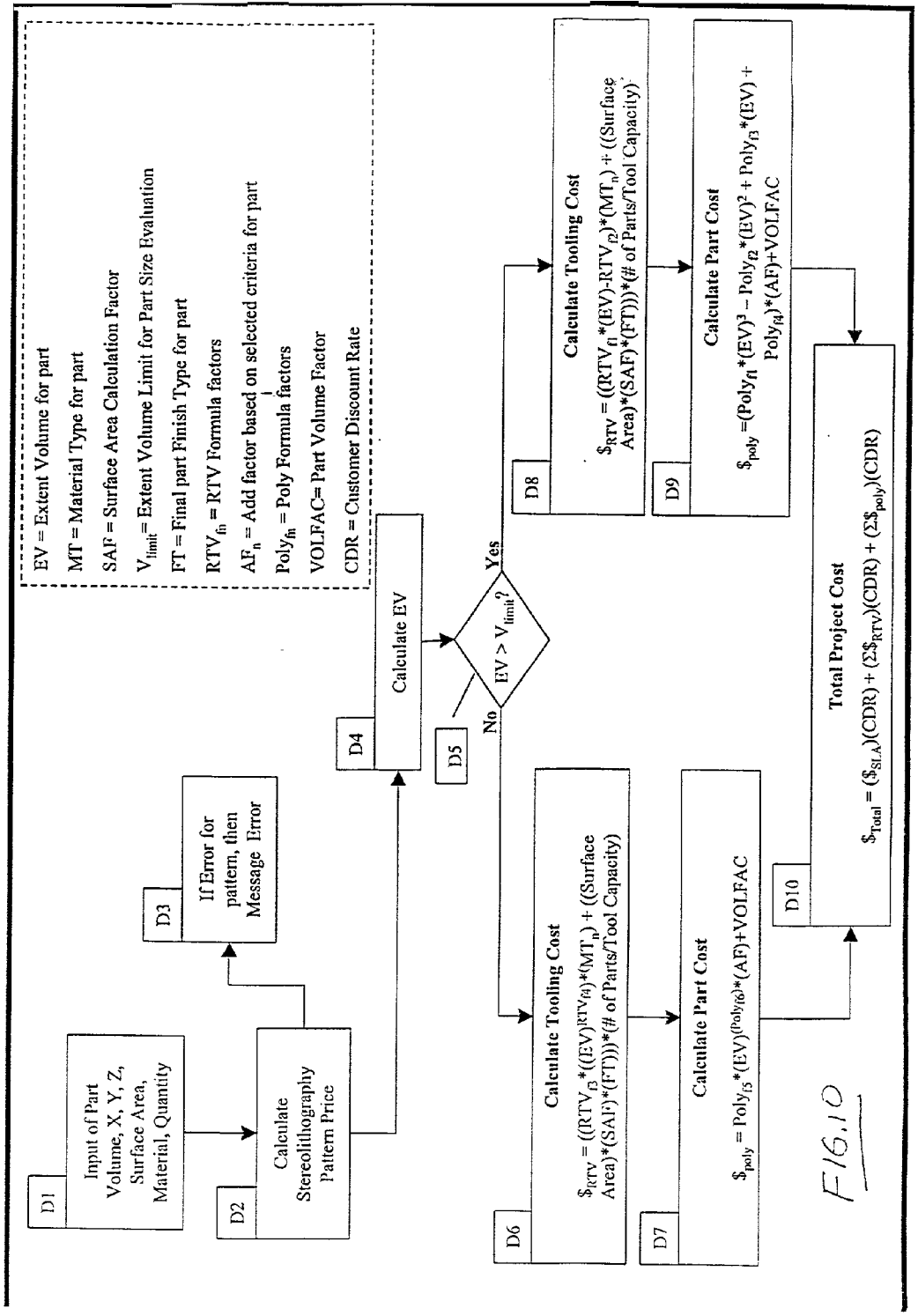
FIG. 10 is a flowchart describing applicant's computer program utilized to analyze a CAD file and provide an automatic price quotation utilizing Room Temperature Vulcanized (RTV) Silicone tooling and urethane casting.

Another formative manufacturing process for which prices can be determined utilizing the present invention is the Room Temperature Vulcanized (RTV) Silicone tooling and urethane casting process. FIG. 10 illustrates the structure of the computer program utilized to calculate prices for the RTV Silicone tooling and polyurethane part pricing process. In this process, relatively small quantities of injection molded parts are made from a thermosetting material such as polyurethane. Such a process would typically be used to make small quantities on the order of 25 to 50 parts.

This process can generally be broken down into three steps. First, the cost of a pattern must be determined. This pattern can be created by the stereolithography process, thus allowing the use of the pricing algorithms in this calculation. Then a soft rubber mold is made from the pattern part. Then from 25 to 50 parts may be molded from polyurethane material utilizing the soft rubber mold. Thus, the pricing program set forth in FIG. 10 will first calculate a price for manufacture of the pattern part using the stereolithography process, then it will calculate a tooling cost for manufacturing the soft rubber molds, and then it will calculate the cost for actually molding the final parts from polyurethane material. Those three prices will then be summed to generate a total project cost.

Referring now to FIG. 10, as indicated in block D1, the program will first analyze the STL files defining the parts which are desired, and will calculate the volume of the parts, the x, y and z extents, and the surface area.

As further noted in block D1, the material to be utilized and the quantity of each part will have been input by the customer as previously described with regard to FIG. 5.

Then, as indicated in block D2, the program will calculate a price for manufacturing the initial pattern part using the stereolithography method. This price will be calculated substantially as described above with regard to FIG. 7.

If any error messages are generated during the calculation of the price when using the stereolithography process, then human input may be required as indicated in block D3.

After calculating the price for the stereolithography pattern part, the program goes to block D4 where it calculates the extent volume for each part as the product of the x, y and z extents for the part.

Then, as indicated in block D5, there is a branch in the program wherein the inquiry is made as to whether the extent volume is greater than a pre-determined system variable $V_{LIMIT}$. This system variable $V_{LIMIT}$ is declaring a generalized division of part sizes for proper classification in pricing based on the extent volume of the part. The smaller parts will be priced as indicated in blocks D6 and D7 and the larger parts will be priced as indicated in blocks D8 and D9.

The value of V limit is dependent upon the user of the calculations. The purpose is to determine if a part is "big" or "small".

For the smaller parts, the program will then go to block D6 to calculate the price for manufacturing the soft rubber tooling. This price is calculated in accordance with the following formula:

$$\$_{RTV}=((RTV_{f3}*((EV)^{RTV}{}_{f4}*(MT_n)+((\text{Surface Area})*(SAF)*(FT)))*(\text{\# of Parts/Tool Capacity}) \quad \text{(Equation 5)}$$

In Equation 5, the factor $RTV_{fn}$ is an adjustable variable which will be determined for the particular system again by statistical regression of historical data on a formula of the format set forth in Equation 5.

The adjustable variable SAF is a factor between 0 and 1 that is used to determine the proportional impact the surface area will have on the overall cost. This value is adjustable to the desires of the algorithm user.

Thus, the manufacturing criteria determined in block D1 which will be input to the tooling pricing formula of block D6 include the extent volume which was calculated in block D4 and the surface area which was calculated in block D1.

Thus, as shown in Equation 5, the price of the tooling will depend upon the extent volume, the selected material type, the surface area, the selected finish type, and finally, will be dependent upon the number of parts which have been ordered divided by the full capacity, i.e., the number of parts which can be manufactured with a given soft rubber mold which is on the order of 25 to 50 parts. Thus, if the tool has a capacity of manufacturing 50 parts and the customer has ordered 100 parts, 2 rubber molds will have to be made which will double the calculated costs for manufacturing of the tooling.

Moving then to block D7, the actual pricing for the molding of the polyurethane parts utilizing the rubber molds is determined utilizing Equation 6 as follows:

$$\$_{poly}=\text{Poly}_{f5}*(EV)^{(Poly}{}_{f6)}*(AF)+VOLFAC \quad \text{(Equation 6)}$$

As seen in Equation 6, the cost for manufacturing of the parts is dependent primarily upon the extent volume of the parts.

The Add Factor, AF, is a multiplicative factor dependent on the material requirements of the parts. There is a % increase in price for parts to be manufactured with non-standard material.

The VOLFAC is an additive parameter used to compensate for the cost of setup to produce the parts. The cost of the setup (default at $50) is distributed over the total number of parts required. The calculation is ratio of volume (variable) and number of parts required.

If the query in block D5 indicates that the parts fall into the larger category, the price for manufacturing of the rubber molds will be calculated as shown in block D8 and the price for actual molding of the parts will be calculated as indicated in block D9, utilizing similar factors to those described above regarding blocks D6 and D7.

The form of the pricing formula set forth in block D9 has been chosen to best fit the historical pricing curves utilized in this pricing analysis.

In general, the technique of deriving a pricing formula to be used with the present invention can be described as having two steps. First, a form of equation is chosen that is most similar in shape (e.g. straight line, various curves, etc.) to the historical data. Second, the values of the constants in the formula are determined by a statistical regression of historical pricing data onto the chosen formula.

Figure 11:
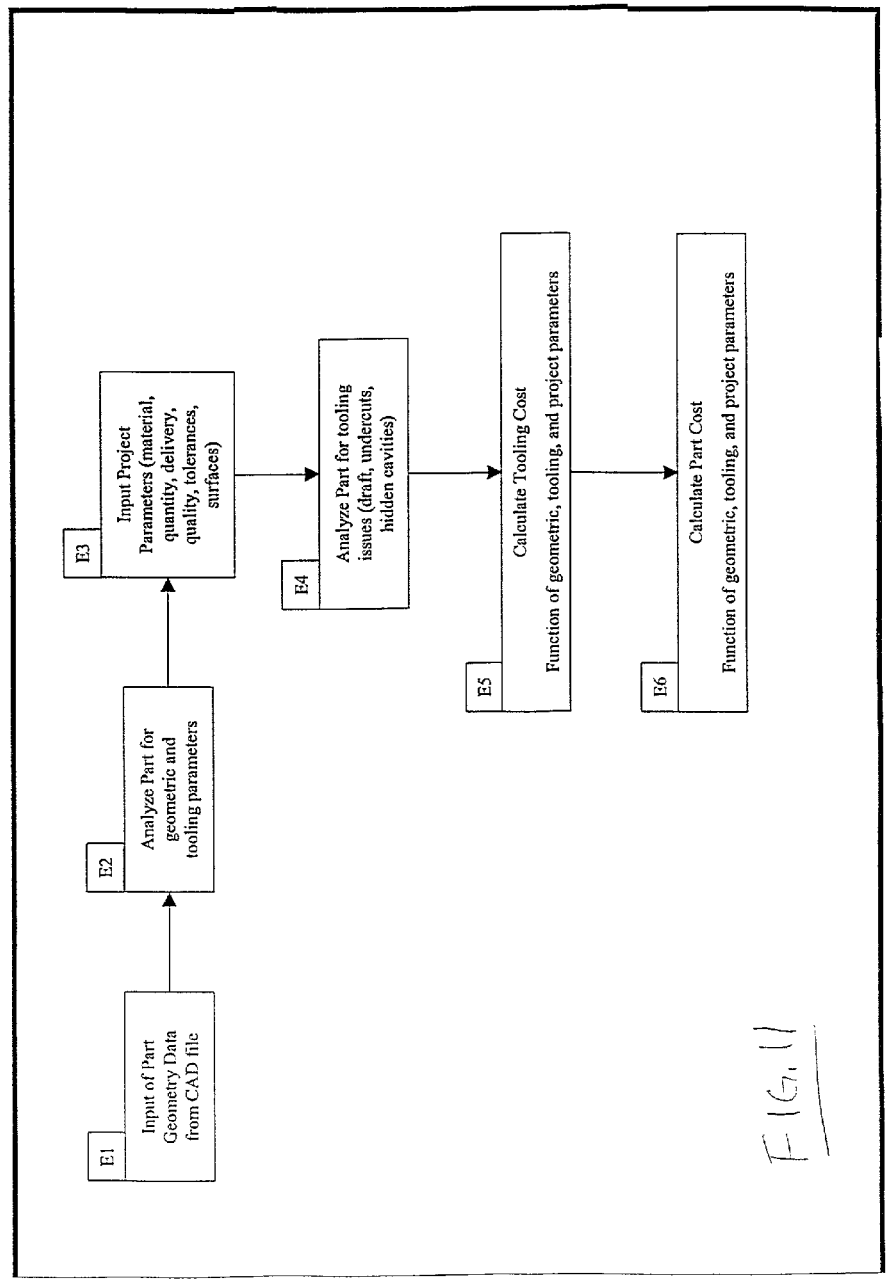
FIG. 11 is a flow chart describing applicant's computer program utilized to analyze a CAD file and provide an automatic price quotation for production quantity manufacturing of plastic injection molded parts from thermoplastic materials.

Description of the Computer Program for Automated Quotation of Prices for Parts Manufactured with Injection Molded Tooling Referring now to FIG. 11, the ultimate application of the present invention to the production quantity manufacture of parts using steel tooling for plastic injection molding of parts from thermoplastic materials is described.

In block E1, the customer will input the CAD/STL files.

In block E2. the CAD/STL file will be analyzed to determine various manufacturing criteria including, but not limited to volume, x, y and z extents, and surface area. Also, the part data will be analyzed for key tooling parameters, including, but not limited to, the presence of parting lines, undercuts, pockets, protrusions, wall thickness, surface features and solid features.

Then, as indicated in block E3, various project parameters will be input by the user, such as selected materials, quantities, delivery times, quality specifications, tolerances, and surface finishes.

Then, as indicated in block E4, the part will be analyzed for various tooling requirements, including, but not limited to draft, undercuts and hidden cavities.

Then as indicated in block E5, the cost of the tooling will be calculated for this particular part utilizing input from the data acquired in the previous analysis, and generally, the tooling costs can be described as being a function of geometric parameters, tooling parameters and project parameters.

Finally, in block E6 of the cost of the molding of the parts will be calculated utilizing input from the data acquired in the previous analysis, and this cost will generally be a function of geometric parameters, tooling parameters and project parameters.

Summary of the Methods and Apparatus

The method of the present invention can in one aspect be generally described as a method of providing a firm price quotation for a custom manufactured part comprising:
(a) permitting a client 12 to access a server computer system 10 from a client computer 12 over a global communication network 18;
(b) uploading from the client computer 12 to the server computer 10 a CAD file describing the custom manufactured part;
(c) analyzing the CAD file on the server computer system 10 with software such as that described with regard to FIG. 7-11, to determine one or more manufacturing criteria, such as volume of the part and X, Y and Z extent of the part, for the custom manufactured part;
(d) calculating in the server computer system 10 a firm price quotation for the custom manufactured part based upon the one or more manufacturing criteria; and
(e) transmitting the price quotation to the client computer 12 over the global communication network 18.

The calculation of the firm price quotation is performed substantially instantly with a preprogrammed pricing formula like that of Equations 1 and 2 set forth above.

The software utilized to determine the variable inputs to Equation 1 selects the orientation of the part so as to minimize H and thus minimize the calculated price.

The pricing formula of Equation 2 includes a finish charge dependent upon a selected finish and a surface area calculated for the part or parts.

The pricing formula of Equation 2 includes a multiple part charge which is dependent upon the quantity of parts quoted.

As described with regard to FIGS. 2 and 4, the customer is permitted to select one of a plurality of available manufacturing processes. Those available manufacturing processes may be additive manufacturing processes, such as stereolithography, selective laser sintering and/or fused deposition modeling. The available processes may also include formative processes such as the creation of investment casting patterns from which parts can be cast, or the use of RTV Silicone tooling and urethane casting. Other formative processes could be used, as could subtractive processes.

As is evidenced by the various software structures set forth in FIGS. 7-11, the calculation of the price for the custom manufactured parts is dependent upon the selected manufacturing process, and the mode of analysis and calculation of the price will differ for different manufacturing processes, wherein the various manufacturing criteria may impact the cost of manufacture in different ways.

Another of the manufacturing criteria which will be calculated when analyzing the CAD file is the surface area of the parts. The surface area is related to the additional charge which will be made for various surface finishes. Thus, when the client selects one of a plurality of available surface finishes, the price quotation includes a factor like $F_{SLA}$ shown in Equation 2 which is dependent upon the selected surface finish and the calculated surface area.

Furthermore, as noted with regard to FIG. 5, the client is allowed to select the quantity of each part, and the client is allowed to upload as many parts as desired to be manufactured. Thus, a given order or "buildset" may include a large quantity of parts. There is, of course, a pricing advantage when building larger number of parts, and thus, the pricing formula set forth in Equation 2 includes the multiple part charge which takes into account the number of parts being built. Thus, the quantity price per unit is generally less when multiple parts are ordered than is the price for a similar single unit.

Furthermore, as described with regard to FIG. 7 and particularly logic blocks A13 and A14, the software is capable of dividing the buildset into a plurality of subsets small enough for each subset to fit on the manufacturing platform of the machines to be used, and then the software sums the subset price quotations to provide a firm price quotation for the entire buildset. This process of dividing the buildset into a plurality of subsets include steps of ordering the parts from largest to least required platform area, and then selecting the largest part sequentially to make up the subsets.

In a similar fashion, when using the process like the selective laser sintering process described with regard to FIG. 8, the software will be structured to efficiently group the parts into subsets which fill a three dimensional space of the available manufacturing operation in an efficient manner. When optimizing the arrangement of subsets of parts for the SLS process, parts are arranged to minimize the overall height of a buildset or of a subset of that buildset.

The computer program described with regard to FIGS. 2-7, or any of the other FIGS. 8-11, may be generally described as a computer program stored in a computer readable media, such as firmware, hard disc, floppy disc, compact disc or the like, for generating binding price quotations for custom manufactured parts. The computer program includes:

- a CAD file analysis program portion as indicated by block A1 of FIG. 7, for receiving a CAD file and analyzing the CAD file to determine one or more manufacturing criteria, such as volume, X, Y and Z extents, and surface area, corresponding to each custom manufactured part;
- a price generation program portion such as indicated at block A15 for generating a binding price quotation based upon the one or more manufacturing criteria;
- a feature selection program portion, such as the process selection indicated in FIG. 4, and the material, surface finish and quantity selection indicated in FIG. 5 and in block A1 of FIG. 7, for allowing a user of the program to select one or more features for the parts being quoted;
- an order generation program portion as described with regard to block 48 of FIG. 2, for assembling all electronic files corresponding to a price quotation into a single directory for transmission to a supplier responsible for the quotation; and
- a buildset grouping program portion as indicated by blocks A13 and A14 of FIG. 7, for grouping a plurality of parts making up a buildset into a plurality of subsets of parts, each subset being of a size that will fit upon an available platform area of a selected manufacturing machine.

Application to More Complex Manufacturing Processes

It will be appreciated that with processes like these referenced in FIGS. 10 and 11, involving the manufacture of the RTV Silicone tooling and urethane castings or plastic injection molding tooling, the geometric complexity of the part to be cast can have a significant effect upon the cost of manufacturing. For example, some parts can be cast very simply in a two part mold and the part will simply fall out of the mold when the mold is opened. Other parts, however, may have undercuts, threads and various complex geometric structures which will require much more complex molds having parts which can contract, retract, etc., in order to allow the molded part to actually be cast and removed from the mold. For such processes, the manufacturing criteria analyzed and identified by the computer program upon analysis of the CAD file, can be specific three-dimensional geometric features, such as undercuts, threads and the like. Then appropriate cost factors can be included in the pricing formula as described above regarding FIGS. 10 and 11

Use of the Pricing Methods in an Offline Environment

It is also noted that for business reasons some customers may choose not to transmit highly confidential design information, such as the CAD files discussed above, over publicly accessible networks such as the Internet. For those customers, the software described with regard to FIGS. 7-11 can be provided on various computer readable media, such as a compact disc or the like which can be loaded upon the customer's computer directly, in order to allow the customer to utilize the pricing formula to generate firm price quotations without ever transmitting the confidential CAD file away from the customer's computer. The software will function in exactly the same manner described with regard to FIGS. 7-11 to generate the price quotations, and then the customer may either choose any of a variety of suitable methods, such as courier delivery, to deliver the quotation along with the confidential CAD files to the supplier of the pricing formula.

Thus, it is seen that the methods and apparatus of the present invention readily achieve the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A method of providing a firm price quotation for a custom manufactured part, comprising:
    (a) receiving access on a server computer system from a customer computer over a global communication network;
    (b) uploading from the customer computer to the server computer system a pre-existing computer aided design (CAD) file describing a three-dimensional custom manufactured part originated by a customer;
    (c) analyzing the pre-existing CAD file on the server computer system to determine one or more manufacturing criteria for the custom manufactured part;
    (d) calculating in the server computer system a firm price quotation for the custom manufactured part based upon the one or more manufacturing criteria; and
    (e) transmitting the price quotation to the customer computer over the global communication network.

2. The method of claim 1, wherein:
step (d) is performed substantially instantly with a pre-programmed pricing formula.

3. The method of claim 1, further comprising:
prior to step (d), receiving on the server computer system a selection from the customer computer of one of a plurality of available manufacturing processes; and
wherein step (d) includes calculating the price quotation for the selected manufacturing process.

4. The method of claim 3, wherein:
the manufacturing process is an additive manufacturing process.

5. The method of claim 4, wherein:
the additive manufacturing process is a stereo lithography process.

6. The method of claim 4, wherein:
the additive manufacturing process is a selective laser sintering process.

7. The method of claim 4, wherein:
the additive manufacturing process is a fused deposition modeling process.

8. The method of claim 3, wherein:
the manufacturing process is a formative manufacturing process.

9. The method of claim 8, wherein:
the one or more manufacturing criteria includes volume of the part.

10. The method of claim 3, wherein:
the manufacturing process includes the molding of parts from soft rubber tooling created using a pattern manufactured by an additive manufacturing process; and
step (d) is performed with a pre-programmed pricing formula which includes a pattern part pricing formula, a tooling pricing formula, and a molded part pricing formula.

11. The method of claim 3, wherein:
the manufacturing process includes injection molding of the parts from thermoplastic material using molds; and
step (d) is performed with a pre-programmed pricing formula which includes a tooling pricing formula and a molded part pricing formula.

12. The method of claim 1, wherein:
in step (c), the one or more manufacturing criteria includes volume of the part.

13. The method of claim 12, wherein:
in step (c), the one or more manufacturing criteria includes the geometric extent of the part along multiple axes.

14. The method of claim 13, wherein:
in step (c), the one or more manufacturing criteria includes surface area of the part.

15. The method of claim 1, wherein:
in step (c), the one or more manufacturing criteria includes the geometric extent of the part along multiple axes.

16. The method of claim 1, wherein:
in step (c), the one or more manufacturing criteria includes surface area of the part.

17. The method of claim 1, further comprising:
prior to step (d), selecting one of a plurality of available materials; and
wherein step (d) includes calculating the price quotation for the selected material.

18. The method of claim 1, further comprising:
prior to step (d), receiving on the server computer system a selection from the customer computer of one of a plurality of available surface finishes;
wherein in step (c), the one or more manufacturing criteria includes surface area of the part; and
wherein in step (d), the price quotation is dependent upon the selected surface finish and the surface area.

19. The method of claim 1, further comprising:
receiving on the server computer system from the customer computer an order to purchase the custom manufactured part online based upon the price quotation.

20. The method of claim 1, further comprising:
prior to step (d), receiving on the server computer system a selection from the customer computer of a quantity of the part greater than one; and
wherein step (d) includes calculating the price quotation for the selected quantity, wherein the quantity price per unit is less than the price for a single unit.

21. The method of claim 1, being further characterized as a method for providing a firm price quotation for a buildset including a plurality of custom manufactured parts, comprising:
determining a platform area required by each part of the buildset and determining a total platform area required by the buildset;
comparing the total platform area required by the buildset to an available platform area of a manufacturing machine to determine whether the entire buildset will fit on the platform;
if the entire buildset will not fit on the platform, dividing the buildset into a plurality of subsets small enough for each subset to fit on the platform; and
wherein step (d) further includes calculating a firm price quotation for each subset, and summing the subset price quotations to provide a firm price quotation for the entire buildset.

22. The method of claim 21, wherein the dividing step includes:
ordering the parts from largest to least required platform area; and
selecting the largest parts sequentially to make-up the subsets.

23. The method of claim 1, wherein in step (b) the CAD file is an STL file.

24. The method of claim 1, being further characterized as a method for providing a firm price quotation for a buildset including a plurality of custom manufactured parts, wherein:
step (c) includes:
determining X, Y and Z components for a rectangular box space enclosing each part; and
optimizing an arrangement of the parts of the buildset within an available volume of a selected manufacturing machine to minimize an overall height of the buildset within the manufacturing machine, the overall height of the buildset being one of the one or more manufacturing criteria; and
step (d) includes calculating a firm price quotation for the entire buildset based at least in part upon the overall height of the buildset.

25. The method of claim 1, wherein the one or more manufacturing criteria further includes identification of three-dimensional geometric features relevant to a difficulty of the manufacturing process.

26. The method of claim 25, wherein the three-dimensional geometric features include at least one feature selected from the group consisting of parting lines, undercuts, pockets, protrusions, wall thickness, surface features and solid features.

27. A program stored in a computer readable media for generating binding price quotations for custom manufactured parts comprising:
a CAD file analysis program portion for receiving a pre-existing CAD file describing one or more three-dimensional custom manufactured parts originated by a customer, said pre-existing CAD file being constructed independently of the program, and for analyzing the pre-existing CAD file to determine one or more manufacturing criteria corresponding to each three-dimensional custom manufactured part; and
a price generation program portion for generating a binding price quotation based upon the one or more manufacturing criteria when executed by a processor.

28. The program of claim 27, wherein the CAD files are in STL format.

29. The program of claim 27, further comprising:
a feature selection program portion for receiving a customer selection of one or more features for the parts being quoted.

30. The program of claim 29, wherein the one or more features include:
material;
manufacturing process; and
surface finish.

31. The program of claim 29, wherein:
the feature selection program portion receives a customer selection of one of a plurality of manufacturing processes to be used to manufacture the parts.

32. The program of claim 31, wherein the plurality of manufacturing processes includes:
stereo lithography;
selective laser sintering; and
fused deposition modeling.

33. The program of claim 31, wherein the plurality of manufacturing processes include:
  at least one additive manufacturing process; and
  at least one formative manufacturing process.

34. The program of claim 27, wherein the one or more manufacturing criteria include:
  volume of each part;
  geometric extents of each part along multiple axes; and
  surface area of each part.

35. The program of claim 34, wherein the one or more manufacturing criteria further includes identification of three-dimensional geometric features relevant to a difficulty of a manufacturing process.

36. The program of claim 35 wherein the three-dimensional geometric features include at least one feature selected from the group consisting of parting lines, undercuts, pockets, protrusion, wall thickness, surface features and solid features.

37. The program of claim 27, further comprising:
  an order generation program portion for assembling all electronic files corresponding to a price quotation into a single directory for transmission to a supplier responsible for the quotation.

38. The program of claim 27, further comprising:
  a buildset grouping program portion for grouping a plurality of parts making up a buildset into a plurality of subsets of parts, each subset being of a size that will fit upon an available platform area of a selected manufacturing machine.

39. The program of claim 38, wherein:
  the price generation program portion calculates a price quotation for each subset, and sums the subset price quotations to generate a binding price quotation for the entire buildset.

40. The program of claim 38, wherein:
  the buildset grouping program portion determines a platform area required by each part, orders the parts from largest to least required platform area, and selects the largest parts sequentially to make-up the subsets.

41. The program of claim 27, further comprising:
  a buildset grouping program portion for grouping a plurality of parts making up the buildset into a plurality of subsets of parts, each subset being of a size that will fit into an available volume of a selected manufacturing machine.

42. The program of claim 27, further comprising:
  a buildset grouping program portion for determining X, Y and Z components for a rectangular box space enclosing each part of a plurality of parts making up a buildset and for then optimizing an arrangement of the parts within the available volume to minimize an overall height of the buildset within the manufacturing machine; and
  wherein the price generation program portion includes overall height of the buildset as one of the one or more manufacturing criteria.

43. A method of providing a firm price quotation for a custom manufactured part, comprising:
  (a) loading onto a computer system a pre-existing computer aided design (CAD) file describing a three-dimensional custom manufactured part of shape originated by a customer;
  (b) analyzing the pre-existing CAD file on the computer system without human intervention to determine one or more manufacturing criteria for the three-dimensional custom manufactured part;
  (c) calculating in the computer system without human intervention a firm price quotation for the three-dimensional custom manufactured part based upon the one or more manufacturing criteria; and
  (d) displaying the price quotation.

44. The method of claim 43, wherein:
  step (c) is performed substantially instantly with a pre-programmed pricing formula.

45. The method of claim 43, further comprising:
  prior to step (c) receiving from a user a selection of one of a plurality of available manufacturing processes; and
  wherein step (c) includes calculating the price quotation for the selected manufacturing process.

46. The method of claim 43, wherein:
  in step (b), the one or more manufacturing criteria includes volume of the part.

47. The method of claim 43, wherein:
  in step (b), the one or more manufacturing criteria includes the geometric extent of the part along multiple axes.

48. The method of claim 43, wherein:
  in step (b), the one or more manufacturing criteria includes surface area of the part.

49. The method of claim 43, further comprising:
  prior to step (c), selecting one of a plurality of available materials; and
  wherein step (c) includes calculating the price quotation for the selected material.

50. The method of claim 43, further comprising:
  prior to step (c), receiving from a customer a selection of one of a plurality of available surface finishes;
  wherein in step (b), the one or more manufacturing criteria includes surface area of the part; and
  wherein in step (c), the price quotation is dependent upon the selected surface finish and the surface area.

51. The method of claim 43, further comprising:
  prior to step (c), receiving on the computer system a selection by a customer of a quantity of the part greater than one; and
  wherein step (c) includes calculating the price quotation for the selected quantity, wherein the quantity price per unit is less than the price for a single unit.

52. The method of claim 43, being further characterized as a method for providing a firm price quotation for a buildset including a plurality of custom manufactured parts, comprising:
  determining a platform area required by each part of the buildset and determining a total platform area required by the buildset;
  comparing the total platform area required by the buildset to an available platform area of a manufacturing machine to determine whether the entire buildset will fit on the platform;
  if the entire buildset will not fit on the platform, dividing the buildset into a plurality of subsets small enough for each subset to fit on the platform;
  wherein step (c) further includes calculating a firm price quotation for each subset, and summing the subset price quotations to provide a firm price quotation for the entire buildset.

53. The method of claim 52, wherein the dividing step includes:
  ordering the parts from largest to least required platform area; and
  selecting the largest parts sequentially to make-up the subsets.

54. The method of claim 43, being further characterized as a method for providing a firm price quotation for a buildset including a plurality of custom manufactured parts, wherein:

step (b) includes:
- determining X, Y and Z components for a rectangular box space enclosing each part; and
- optimizing an arrangement of the parts of the buildset within an available volume of a selected manufacturing machine to minimize an overall height of the buildset within the manufacturing machine, the overall height of the buildset being one of the one or more manufacturing criteria; and step (c) includes calculating a firm price quotation for the entire buildset based at least in part upon the overall height of the buildset.

55. The method of claim 43, wherein the one or more manufacturing criteria further includes identification of three-dimensional geometric features relevant to a difficulty of the manufacturing process.

56. The method of claim 55, wherein the three-dimensional geometric features include at least one feature selected from the group consisting of parting lines, undercuts, pockets, protrusions, wall thickness, surface features and solid features.

57. The method of claim 43, wherein:

the computer system includes both a customer computer and a server computer.

58. The method of claim 57, wherein:

the customer computer and the server computer communicate with each other over a global communication network.

59. The method of claim 43, wherein:

the computer system includes one and only one computer.

60. A method of providing a firm price quotation for a custom manufactured part, comprising:
- (a) receiving access on a server computer from a customer computer over a global communication network;
- (b) loading onto one of the customer computer and the server computer a pre-existing computer aided design (CAD) file describing a three-dimensional custom manufactured part, said pre-existing CAD file being created by a customer prior to accessing the server computer;
- (c) analyzing the CAD file on said one computer to determine one or more manufacturing criteria for the three-dimensional custom manufactured part;
- (d) calculating in the server computer a firm price quotation for the three-dimensional custom manufactured part based upon the one or more manufacturing criteria; and
- (e) transmitting the price quotation to the customer computer over the global communication network.

61. A method of providing a firm price quotation for a custom manufactured part, comprising:
- (a) receiving access on a server computer system from a customer computer over a global communication network;
- (b) uploading from the customer computer to the server computer system a pre-existing three-dimensional computer aided design (CAD) file describing a three-dimensional custom manufactured part, said pre-existing three-dimensional CAD file being created by a customer prior to accessing the server computer system;
- (c) analyzing the CAD file on the server computer system to determine one or more manufacturing criteria for the three-dimensional custom manufactured part; and
- (d) calculating in the server computer system a firm price quotation for the three-dimensional custom manufactured part based upon the one or more manufacturing criteria.

62. A method of providing a firm price quotation for a custom manufactured part, comprising:
- (a) loading onto a computer a pre-existing computer aided design (CAD) file describing a three-dimensional custom manufactured part, said pre-existing CAD file being independently constructed by a customer free of any design restraints imposed by the computer;
- (b) analyzing the pre-existing CAD file on the computer to determine one or more manufacturing criteria for the three-dimensional custom manufactured part; and
- (c) calculating a firm price quotation for the three-dimensional custom manufactured part based upon the one or more manufacturing criteria.

63. A method of providing a firm price quotation for a custom manufactured part to be manufactured by injection molding of thermoplastic material, comprising:
- (a) receiving access on a server computer system from a customer computer over a global communication network;
- (b) uploading from the customer computer to the server computer system a pre-existing computer aided design (CAD) file describing a three-dimensional custom manufactured part originated by a customer;
- (c) analyzing the CAD file on the server computer system to determine one or more manufacturing criteria for the three-dimensional custom manufactured part; and
- (d) calculating a firm price quotation for the three-dimensional custom manufactured part based upon the one or more manufacturing criteria, said quotation being based upon both tooling pricing and molded part pricing.

* * * * *